United States Patent [19]

Wickersheim

[11] Patent Number: 4,560,286
[45] Date of Patent: Dec. 24, 1985

[54] OPTICAL TEMPERATURE MEASUREMENT TECHNIQUES UTILIZING PHOSPHORS

[75] Inventor: Kenneth A. Wickersheim, Palo Alto, Calif.

[73] Assignee: Luxtron Corporation, Mountain View, Calif.

[21] Appl. No.: 558,305

[22] Filed: Dec. 5, 1983

Related U.S. Application Data

[60] Division of Ser. No. 167,691, Jul. 10, 1980, Pat. No. 4,448,547, which is a continuation-in-part of Ser. No. 877,977, Feb. 15, 1978, Pat. No. 4,215,275, which is a continuation-in-part of Ser. No. 751,366, Dec. 16, 1976, Pat. No. 4,075,493.

[30] Foreign Application Priority Data

Dec. 7, 1977 [GB] United Kingdom .............. 51006/77

[51] Int. Cl.$^4$ .................... G01N 21/31; G01J 5/02
[52] U.S. Cl. ................... 374/131; 128/736; 250/461.1; 374/159; 374/141
[58] Field of Search ............ 374/131, 159, 137, 158, 374/209; 250/461.1, 458.1, 227, 361 R; 128/736

[56] References Cited

U.S. PATENT DOCUMENTS

| | | | |
|---|---|---|---|
| 2,551,650 | 5/1951 | Urbach | 374/159 X |
| 2,642,538 | 6/1953 | Urbach | 250/461.1 X |
| 3,142,755 | 7/1964 | Leroux | 374/159 |
| 3,215,846 | 11/1965 | McNaney | 250/342 X |
| 3,315,160 | 4/1967 | Goodman | 350/96.1 X |
| 3,529,121 | 9/1970 | Bobo | 219/109 X |
| 3,626,758 | 12/1971 | Stewart et al. | 356/44 X |
| 3,639,765 | 2/1972 | Kleinerman | 250/330 |
| 3,811,777 | 5/1974 | Chance | 128/653 X |
| 3,822,593 | 7/1974 | Oudewaal | 338/28 X |
| 3,822,598 | 7/1974 | Brothers et al. | 374/158 X |
| 3,872,727 | 3/1975 | Johnson | 374/158 X |
| 3,929,018 | 12/1975 | Turner | 374/158 |
| 3,965,360 | 6/1976 | Sakasegawa et al. | 250/461.1 |
| 4,016,761 | 3/1977 | Rozzell et al. | 374/359 |
| 4,061,578 | 12/1977 | Kleinerman | 250/330 |
| 4,075,493 | 2/1978 | Wickersheim | 250/461.1 |
| 4,136,566 | 1/1979 | Christensen | 374/161 |
| 4,140,393 | 2/1979 | Cetas | 250/474 X |
| 4,179,927 | 12/1979 | Saaski | 374/152 |
| 4,215,275 | 7/1980 | Wickersheim | 250/459.1 |
| 4,448,547 | 5/1984 | Wickersheim | 250/461.1 X |

FOREIGN PATENT DOCUMENTS

| | | | |
|---|---|---|---|
| 0488339 | 1/1976 | Australia | 374/121 |
| 2632633 | 2/1977 | Fed. Rep. of Germany | |
| 51452 | 2/1974 | Japan | |
| 31382 | 3/1974 | Japan | |
| 31035 | 10/1978 | Japan | |

OTHER PUBLICATIONS

Mesure de Temperatures de Surface, Leroux & Taboue, Mesures.Regulation.Automatisme–Oct. 1975, pp. 49–53.

"Line Shift Method for Phosphor Temperature Measurement," Kusma, et al., *Japanese Journal of Applied Physics*, vol. 15, No. 12, Dec. 1976, pp. 2349–2358.

"A New Non-Perturbing Temperature Probe Using Semiconductor Bank Edge Shift," D. A. Christensen, *Journal of Bioengineering*, vol. 1, pp. 541–545 (1977).

*Primary Examiner*—Daniel M. Yasich
*Attorney, Agent, or Firm*—Majestic, Gallagher, Parsons & Siebert

[57] ABSTRACT

A technique of temperature measurement wherein an object or environment to be measured is provided with a phosphor material layer that emits at least two optically isolatable wavelength ranges whose intensity ratio depends upon the object or environment temperature, the emitted radiation being brought to a detector by an optical system that may include an optical fiber. Several specific applications of this technique are disclosed, such as temperature monitoring of electrical equipment and industrial processing, medical temperature instrumentation including the use of disposable elements that contain a small quantity of the temperature dependent phosphor, special and multiple probes, the use of liquid phosphors, and a phosphor paint for monitoring surface temperatures.

27 Claims, 34 Drawing Figures

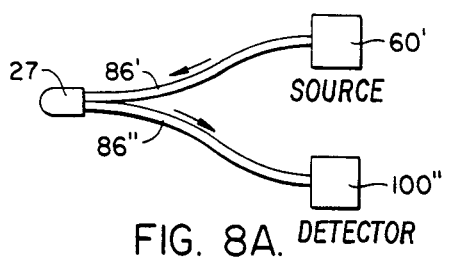
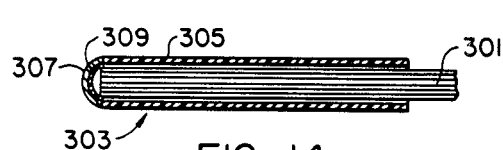
FIG. 8A.   FIG. 14.
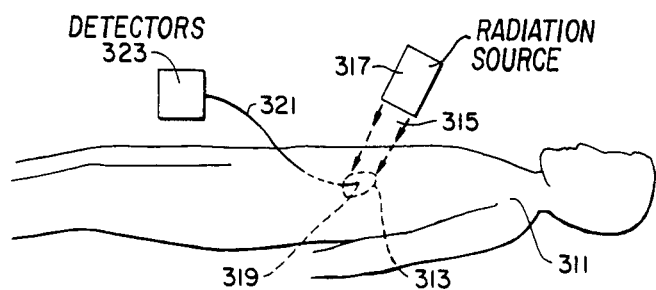
FIG. 15.
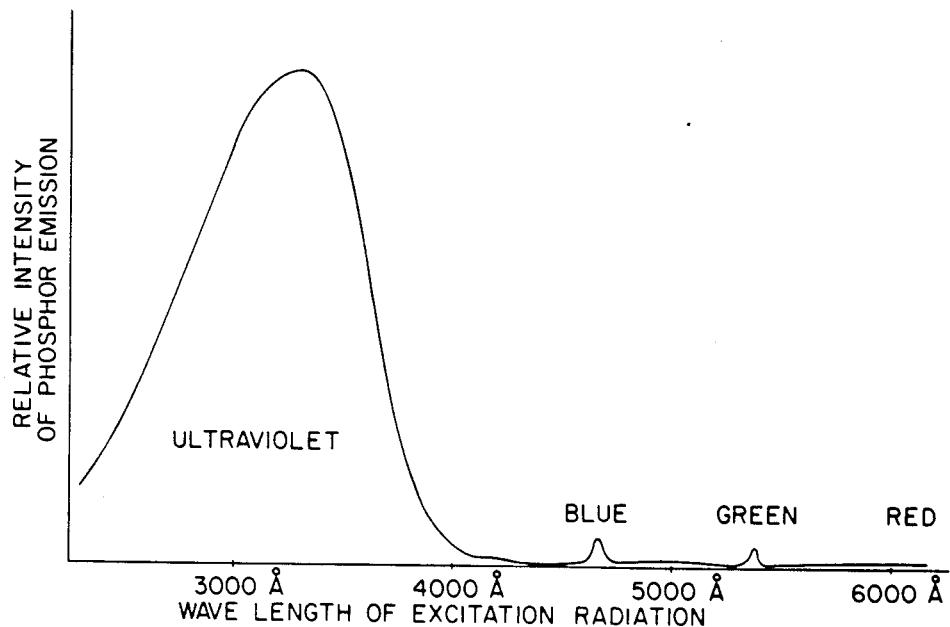
FIG. 3A.

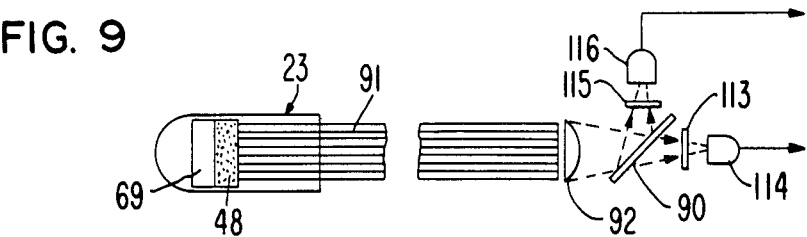
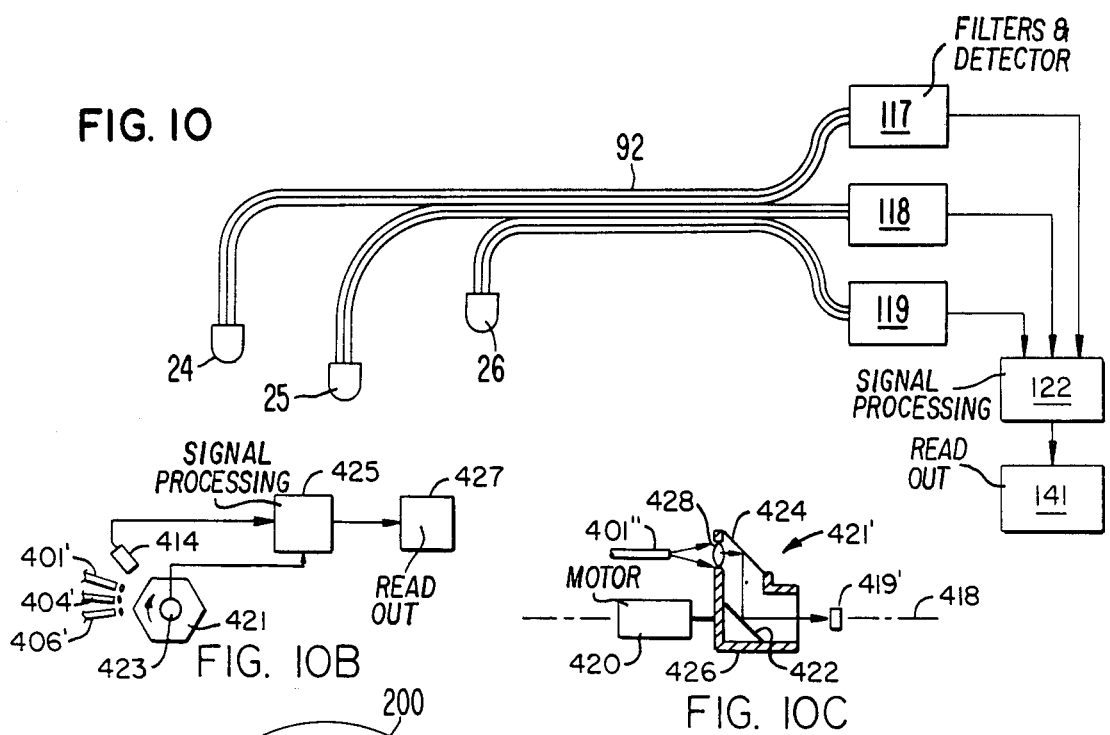
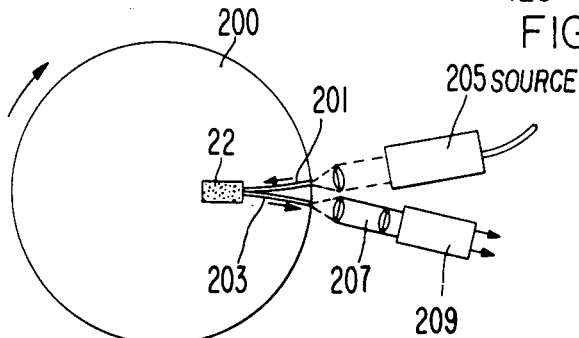
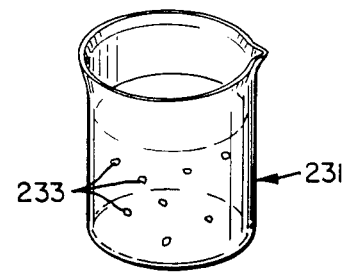

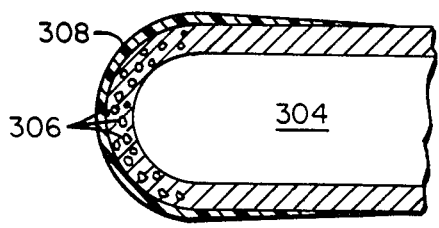
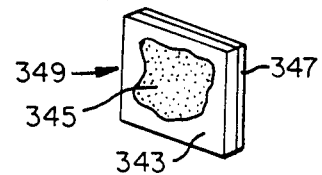
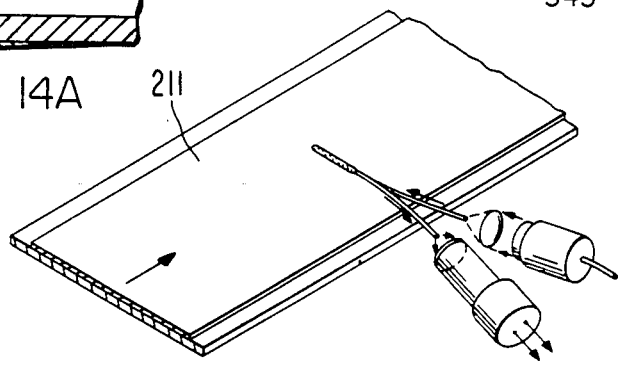
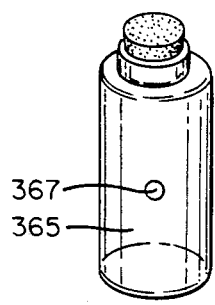
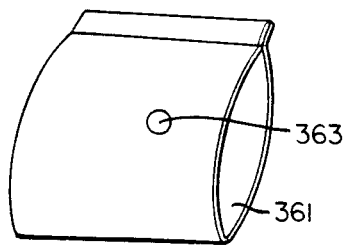
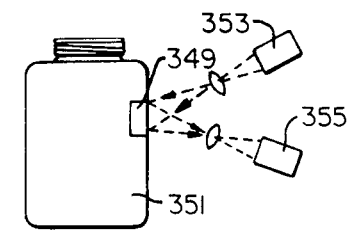
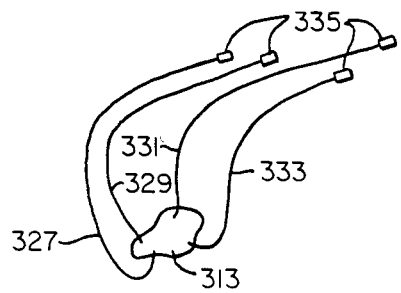
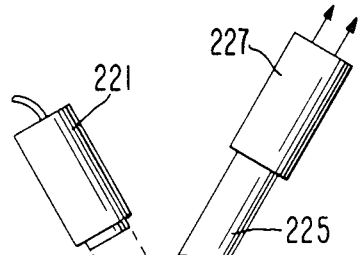
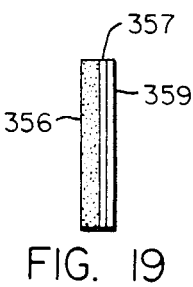
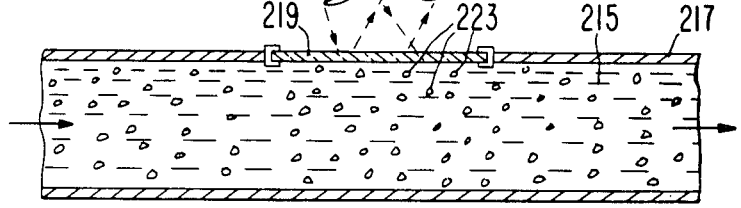

OPTICAL TEMPERATURE MEASUREMENT TECHNIQUES UTILIZING PHOSPHORS

This is a division of Application Ser. No. 167,691, filed July 10, 1980, now U.S. Pat. No. 4,448,547, which is a continuation-in-part of application Ser. No. 877,977, filed Feb. 15, 1978, now U.S. Pat. No. 4,215,275, which in turn is a continuation-in-part of application Ser. No. 751,366, filed Dec. 16, 1976, now U.S. Pat. No. 4,075,493.

BACKGROUND OF THE INVENTION

This invention relates generally to devices and methods for making temperature measurements, and more specifically to devices and methods that make such measurements by optical techniques that utilize temperature-sensitive phosphors.

There are many methods currently used for temperature measurement. The most common techniques utilize thermocouples, thermistors or resistance thermometers by means of which electrical signals are generated and then converted into temperature readings or employed for control functions.

On occasion, however, it is useful, and sometimes essential, to obtain temperature data by non-electrical techniques. This may occur: (1) where temperatures over large areas are to be measured and measurement by a dense distribution of thermocouples thus becomes impractical; (2) where the attachment of thermocouples and leads would alter the temperatures to be measured; (3) in environments where, because of high electric or magnetic fields, metallic wires are undesirable; (4) where electrical isolation and/or insensitivity to electrical noise generation is desired; (5) where, because of motion or remoteness of the part to be sensed, permanent lead wires are impractical; or (6) where, because of corrosive chemical environments, wires and thermocouple junctions would be adversely affected, with resultant changes in electrical characteristics. In these situations, optical techniques frequently become preferable.

The most direct optical technique for temperature measurement is infrared radiometry. However, where line of sight measurement is not possible, without infrared transmission media, the infrared techniques suffer a disadvantage. In such an instance there are relatively few materials sufficiently transparent to long-wave infrared radiation to provide an infrared conducting path from the area where temperature is to be sensed to the infrared detector. Furthermore, infrared techniques are not absolute in that the emissivity of the emitting material has to be known accurately if the infrared radiometric measurements are to be converted into true temperature readings.

Optical pyrometers can also be used, but only for very hot sources which emit visible radiation. Optical pyrometers also suffer from the same problems as infrared radiometers when it comes to absolute measurements.

For large area measurements, thermographic phosphors or liquid crystals are sometimes employed in the form of films, paint or coatings applied to the surface to be measured. Known typical thermographic phosphors exhibit a broad fluorescence under ultraviolet excitation, this fluorescence being strongly temperature-dependent with regard to emission intensity. The fluorescent intensity of this emission "quenches" sharply as the temperature rises over a fairly narrow temperature range. It is difficult to calibrate a thermographic phosphor absolutely because changes in excitation, such as might be caused by source instability, can be misinterpreted as a temperature variation. Liquid crystals change their reflected colors with temperature over a similarly narrow range. Both materials suffer from the fact that, to achieve high sensitivity, the range over which the material will operate as temperature sensors is of necessity fairly restricted compared with the materials of this invention. Most liquid crystal materials are also relatively unstable and may change their chemical and physical properties over a period of time. While this is not always a problem, it can be in selected applications.

Therefore, it is a primary object of the present invention to provide methods and systems for remote temperature measurement using optical, rather than electrical, techniques that permit elimination of metallic wires, junctions and connectors, that circumvent electrical noise sources and that provide for measurement over extended areas as well as point measurements.

It is another object of the present invention to provide an internally calibrated phosphor temperature measuring system whereby changes in total fluorescent intensity with time as might be caused by a variation in excitation, changes in optical transmission with time or changes in sensitivity of a receiving detector with time are not interpreted as temperature changes.

It is yet another object of the present invention to provide a means of measuring temperatures of objects or environments without the necessity of direct physical contact with electrical wires, such as situations where the point to be measured is submerged in a corrosive gas or liquid, must be isolated electrically or thermally, is in a vacuum, or is located on a moving part to which permanent leads cannot be conveniently connected.

It is a further object of the present invention to provide techniques adapted for medical and clinical temperature measurement applications.

It is also an object of the present invention to provide a means of making absolute, internally calibrated temperature measurements over wider temperature ranges than would be possible with conventional thermographic phosphors or liquid crystals.

Finally, it is an object of the present invention to provide unique arrangements and temperature measuring applications of conventional thermographic phosphors.

SUMMARY OF THE INVENTION

These and additional objects are accomplished by the techniques of the present invention wherein, generally, according to one aspect thereof, an object or environment for which a temperature is to be measured is placed in thermal contact with phosphor material that when excited to luminescence emits detectable radiation within two or more distinct wavelength ranges that are optically isolatable from one another, with a relative intensity of emission in these wavelength ranges varying in a known manner as a function of the temperature of the phosphor. Sharp line emitting phosphors, such as those having rare earth activators, are preferred. A practical system of accurately measuring temperatures over wide ranges is thus made possible, a normal desired range of from $-100°$ C. to $+400°$ C. being achievable.

The intensity of two such lines of phosphor emission are detected and a ratio of the detected signals taken. The ratio is convertible into temperature in accordance with the known temperature characteristics of the phosphor material. This optical system is internally calibrated because the taking of a ratio makes the technique relatively insensitive to changes in total intensity of the phosphor emissions, general changes in optical transmission, or changes in the sensitivity of the receiving detector which may occur in time. The technique is thus adapted for long term remote temperature measurement applications. It also makes feasible the manufacture of interchangeable or disposable sensors such as probes, paints, adhesive spots, etc., wherein the light output may vary from probe to probe whereas the ratio may be unaffected.

The phosphor temperature sensor is excitable to luminescence by electromagnetic radiation in the visible or near-visible portion of the spectrum in order that standard optical elements may be employed. The preferred phosphor is also characterized by emitting useful temperature dependent lines at much different wavelengths than that of the exciting radiation. This characteristic allows easy elimination of the exciting radiation from the luminescent radiation detectors. However, other more conventional phosphors can also be utilized.

The use of this approach permits several specific temperature measurement improvements and solves heretofore unsolved temperature measuring problems. According to one specific form of the invention, remote, non-contact temperature measurements can be made of large surface areas, such as those in models being tested in wind tunnels, by applying a phosphor paint over the surface areas to be monitored. The model or other surface is then illuminated by an appropriate exciting radiation and intensity measurements of the selected phosphor luminescent lines are taken of selected points on the surface from a distance removed from it.

According to another specific aspect of the invention, remote measurement of point temperatures are made possible. According to the present invention, the phosphor material is formed internal to a small sensor on the end of a fiber optic cable. The sensor is then immersed in the location where a point temperature measurement is needed. The phosphor is coupled to the detector by means of the fiber optic cable with the measurements of the phosphor luminescence being made at a distance from the measurement location.

The techniques of the present invention also have advantages in applications where distance of the measuring location from the detection station is not of principal concern. In medical applications, for example, the improved measurement precision and short response time provided by the present invention is among several substantial advantages. Routine human temperature measurements may be made with an optical fiber end covered by a disposable probe cover that contains a small quantity of phosphor. Hyperthermia treatment of a human may be precisely monitored by fiber optic lengths having their phosphor-coated ends implanted at different locations within the patient. Medical and non-medical temperature measurements of moving objects, sample cells or containers can also advantageously utilize the techniques of the present invention that utilize both conventional thermographic phosphors and the preferred sharp emission line phosphors described in detail herein.

Disposable substrates with a quantity of phosphor carried thereby are also a part of the present invention. The ratioing system of the present invention, in which such substrates are employed, automatically calibrates for any differences in emission level of the phosphor, thus providing a high tolerance to variations in manufacturing of the disposable substrates. The substrates can be in the form of a temperature probe, probe cover, length of optical fiber, liquid contact beads, bag or other container, or even a thin sheet with adhesive for placement on any surface desired to be monitored. A simpler detection technique, in which a single emission wavelength range is sensed such as with a more conventional phosphor compound, may also advantageously be employed in these unique applications without ratioing intensities of different emission bandwidths, but the calibration of such a system is more difficult.

The temperature sensing techniques described herein have significant advantages for operating in environments of high electric or magnetic fields or in the presence of strong electromagnetic radiation. The phosphor selected for such an environment has detected optical emissions that are unaffected by the environment.

Many of the features described herein and other features and details of the invention are set forth in an article entitled "Recent Advances in Optical Temperature Measurements" by applicant and another, appearing in the December, 1979 issue of Industrial Research-/Development, pages 82-89, which article is incorporated herein by reference.

The present invention has been described only very generally. Additional objects, advantages and features thereof are set forth as part of the following description of the preferred embodiments of the various aspects of the present invention, which should be taken in conjunction with the accompanying drawings.

BRIEF DESCRIPTION OF THE DRAWINGS

FIG. 3A is a sample excitation spectrum for a rare earth oxysulfide measured at a single radiation output line;

FIG. 8A illustrates a modification of the temperature measurement system of FIG. 8;

FIG. 9 shows a variation in the temperature measurement system of FIG. 8;

FIG. 10 shows yet another variation of the temperature measurement system of FIG. 8 utilizing multiple sensors;

FIGS. 10A, 10B and 10C show multiplexing systems for multiple sensors;

FIG. 11 illustrates a rotating device with its internal temperature being measured according to another aspect of the present invention;

FIG. 12 illustrates a moving belt with its temperature being measured according to another aspect of the present invention;

FIGS. 13 and 13A illustrate another aspect of the present invention wherein the temperature of fluid is measured;

FIGS. 14 and 14A illustrate the present invention applied to a system including a removeable temperature probe sleeve;

FIGS. 15 and 15A illustrate the present invention in an application monitoring an internal temperature of a living organism or other biological specimen that is under heat treatment;

FIGS. 17, 18 and 19 illustrate adhesive phosphor carriers and their use;

FIGS. 20 and 20A illustrate disposable containers having phosphor temperature sensors;

DESCRIPTION OF THE PREFERRED EMBODIMENTS

Figure 1:
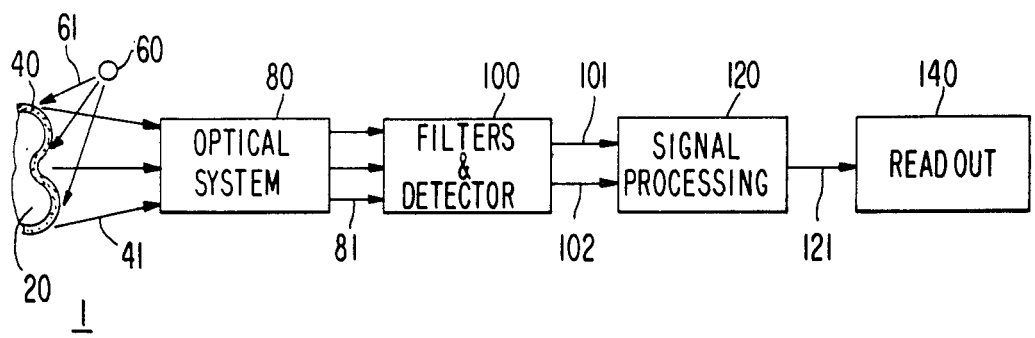
FIG. 1 is a block diagram illustrating in general the basic aspects of the present invention.

Referring to FIG. 1, the system aspect of the present invention is illustrated. Within some environment 1 is positioned a solid object 20 having a phosphor coating 40 over at least a portion thereof. The phosphor is characterized by emitting, when excited, electro-magnetic radiation within separable bandwidths at two or more distinct wavelengths and with relative intensities in those bands that vary as a known function of the temperature of the phosphor 40. Thus, the temperature of the phosphor 40 is detected that is the same as or related to that of the object 20, and in some applications of the environment 1 as well.

Such luminescent emission of the phosphor 40 in the form of electromagnetic radiation 41, generally in or near the visible spectrum, is excited by a source 60 over a path 61. The source could be radioactive material, a source of cathode rays, an ultraviolet electromagnetic energy source, or any other remote source producing efficient fluorescence depending upon the particular type of phosphor utilized in the preferred forms of the present invention. The relative intensities of two distinct wavelength bands within the emitted radiation 41 contains the desired temperature information.

The emitted radiation 41 is gathered by an optical system 80 and directed in a form 81 onto an optical filter and radiation detector block 100. The block 100 contains filters to isolate each of the two bands or lines of interest within the radiation 81 that contain the temperature information. After isolation, the intensity of each of these bands or lines is detected which results in two separate electrical signals in lines 101 and 102, one signal proportional to the intensity of the radiation in one of the two bands and the other signal proportional to the intensity of the radiation in the other of the two bands of interest.

These electrical signals are then applied to an electronic signal processing circuit 120. In a preferred form, the signal processing circuits 120 take a ratio of the signals in the lines 101 and 102 by the use of routinely available circuitry. This electronic ratio signal is then applied to a signal processor within the block 120. The signal processor is an analog or digital device which contains athe relationship of the ratio of the two line intensities as a function of temperature for the particular phosphor 40 utilized. This function is obtained by calibration data for the particular phosphor 40. The output of the signal processor in a line 121 is thence representative of the temperature of the phosphor 40.

The signal in the line 121 is applied to a read out device 140 which displays the temperature of the phosphor 40. The device 140 could be any one of a number of known read out devices, such as a digital or analog display of the temperature over some defined range. The device 140 could even be as elaborate as a color encoded television picture wherein each color represents a narrow temperature range on the object. It could also be a television picture stored on disc or tape. It might also be a chart recorder or the input to a control system.

PREFERRED PHOSPHOR MATERIALS AND CHARACTERISTICS

The fundamental characteristics of a preferred phosphor material for use in the present invention is that when properly excited it emits radiation in at least two different wavelength ranges that are optically isolatable from one another, and further that the intensity variations of the radiation within each of these at least two wavelength ranges as a function of the phosphor temperature are known and different from one another. A phosphor material is preferred that is further characterized by its radiation emission in each of these at least two wavelength bands being sharp lines that rise from substantially zero emission on either side to a maximum line intensity, all in less than 100 angstroms. The lines are easy to isolate and have their own defined bandwidth. But mixtures of broadband emitters, such as of more conventional non-rare earth phosphors, are also usable so long as two different wavelength ranges of emission of the two materials can be separated sufficiently from one another so that an intensity ratio can be taken, and as long as the temperature dependences for thermal quenching are sufficiently different for the two phosphors.

For a practical temperature measuring device, the phosphor material selected should also emit radiation in the visible or near visible region of the spectrum since this is the easiest radiation to detect with available detectors, and since radiation in this region is readily transmitted by glass or quartz windows, fibers, lenses, etc. It is also desirable that the phosphor material selected be an efficient emitter of such radiation in response to some useful and practical form of excitation of the phosphor material. The particular phosphor material or mixture of phosphor materials is also desirably chosen so that the relative change of intensity of emission of radiation within the two wavelength ranges is a maximum within the temperature range to be measured. The phosphor material should also be durable, stable and be capable of reproducing essentially the same results from batch to batch. In the case of fiber optic transmission of the phosphor emission, as described in specific embodiments hereinafter, a sharp line emitting phosphor is desirably selected with the lines having wavelengths near one another so that any wavelength dependent attenuation of the fiber optic will not significantly affect the measured results at a position remote from the phosphor, thereby eliminating or reducing the necessity for intensity compensation that might be necessary if fibers of varying lengths were used.

The composition of a phosphor material capable of providing the characteristics outlined above may be represented very generally by the generic chemical compound description $A_xB_yC_z$, wherein A represents one or more cations, B represents one or more anions, A and B together forming an appropriate non-metallic host compound, and C represents one or more activator elements that are compatable with the host material. x and y are small integers and z is typically in the range of a few hundredths or less.

There are a large number of known existing phosphor compounds from which those satisfying the fundamental characteristic discussed above may be selected by a trial and error process. A preferred group of elements from which the activator element C is chosen is any of the rare earth ions having an unfilled f-electron shell, all of which have sharp isolatable fluorescent emission lines of 10 angstroms bandwidth or less. Certain of these rare earth ions having comparatively strong visible or near visible emission are preferred for convenience of detecting, and they are typically in the trivalent form: praseodymium (Pr), samarium (Sm), europium (Eu), terbium (Tb), dysprosium (Dy), holmium (Ho), erbium (Er) and thulium (Tm). Other activators such as neodymium (Nd) and ytterbium (Yb) might also be useful if infra-red sensitive detectors are used. Other non-rare earth activators having a characteristic of sharp line emission which might be potentially useful in the present invention would include uranium (U) and chromium ($Cr^{3+}$). The activator ion is combined with a compatable host material with a concentration of something less than 10 atom percent relative to the other cations present, and more usually less than 1 atom percent, depending on the particular activator elements and host compounds chosen.

A specific class of compositions which might be included in the phosphor layer 40 is a rare earth phosphor having the composition $(RE)_2O_2S:X$, wherein RE is one element selected from the group consisting of lanthanum (La), gadolinium (Gd) and yttrium (Y), and X is one doping element selected from the group of rare earth elements listed in the preceeding paragraph having a concentration in the range of 0.01 to 10.0 atom percent as a substitute for the RE element. A more usual portion of that concentration range will be a few atom percent and in some cases less than 0.1 atom percent. The concentration is selected for the particular emission characteristics desired for a given application.

Such a phosphor compound may be suspended in an organic binder, a silicone resin binder or a potassium silicate binder. Certain of these binders may be the vehicle for a paint which can be maintained in a liquid state until thinly spread over a surface whose temperature is to be measured where it will dry and thus hold the phosphor on the surface in heat conductive contact with it.

Figure 2:
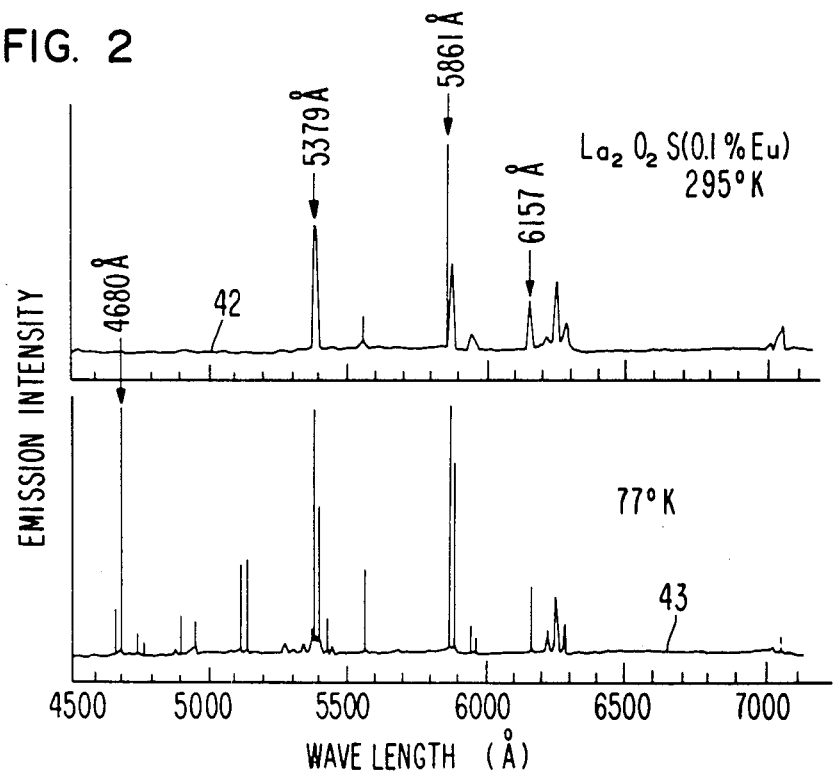
FIG. 2 are curves that illustrate the fluorescent emission spectrum at two different temperatures of a europium-doped lanthanum oxysulfide phosphor when excited by ultraviolet radiation.

A specific example of such a material for the phosphor layer 40 of FIG. 1 that is very good for many applications is europium-doped lanthanum oxysulfide ($La_2O_2S:Eu$) where europium is present in the range of a few atom percent down to 0.01 atom percent as a substitute for lanthanum. The curves 42 and 43 of FIG. 2 provide, for two separate phosphor temperatures, the intensity of its emission as a function of wavelength. The phosphor was in the form of a finely crystalline powder and was excited by electrons. The emitted radiation was analyzed with a scanning monochromator followed by a photomultiplier detector. The particular material for which FIG. 2 illustrates the fluorescent emission spectrum is lanthanum oxysulfide with 0.1 atom percent of europium substituted for lanthanum.

Curve 42 of FIG. 2 shows the emission spectra of such a material at 295° K. which is room temperature. The curve 43 of FIG. 2 shows the emission spectra for the material at 77° K., the extremely cold temperature of liquid nitrogen. It will be noted that the spectral characteristics of the emission are much different at these two temperatures and these changes continue to occur as the phosphor is raised above room temperature.

Narrow wavelength fluorescent lines which are particularly useful for temperature measurement, as marked on the curves of FIG. 2, are located at approximately 4680 angstroms, 5379 angstroms, 5861 angstroms (actually a doublet) and 6157 angstroms. The relative intensities of these lines change as a function of temperature of the phosphor and it is these relative intensities that give the temperature information in the various forms of the present invention.

Figure 3:
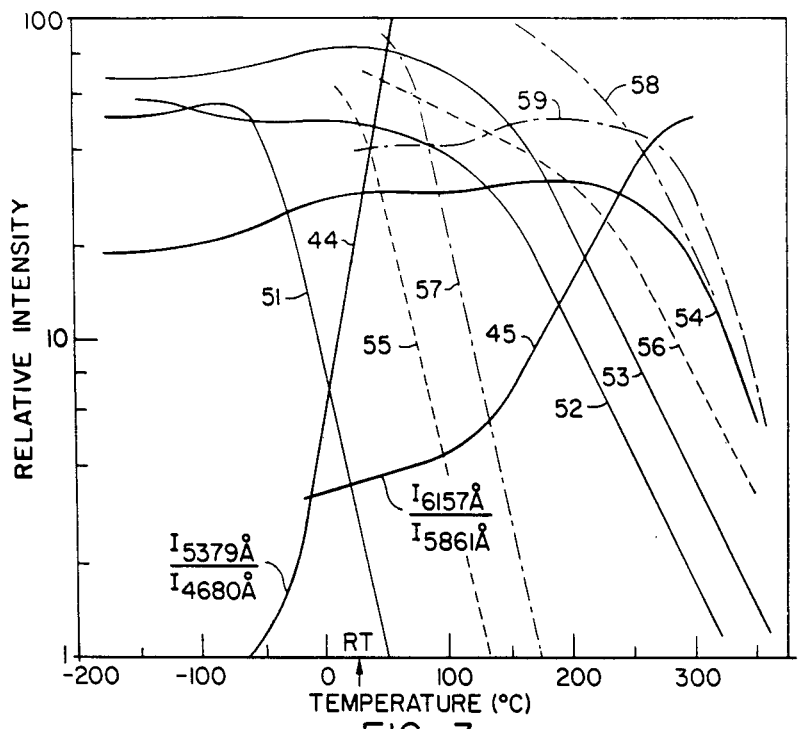
FIG. 3 are curves that illustrate the intensity of specific strong emission lines from certain rare earth oxysulfide phosphors when excited by suitable radiation.

The relative intensities of at least two suitable narrow bandwidth spectral lines are determined, in the preferred forms of the invention, by taking the ratio of the detected intensities of two of the lines. The two lines should thus preferably be non-overlapping and separated enough in wavelength so that their intensities may be measured relatively independently. Referring to FIG. 3, the intensities of the four spectral lines identified on FIG. 2 are drawn as a function of temperature of the phosphor (curves 51, 53 and 54). Additionally, curve 44 of FIG. 3 shows a ratio of the intensities of the two spectral lines 52 and 51 respectively at 5379 angstroms and 4680 angstroms as a function of temperature. It is such a characteristic as illustrated by the curve 44 that permits accurate temperature measurement by taking a ratio of intensities of two spectral lines. Similarly, if the intensities of the other two lines 52 and 51 respectively at 6157 angstroms and 5861 angstroms are ratioed, the characteristics of the resulting ratio as a function of temperature is given in curve 45. As can be seen from FIG. 3, the ratio represented by the curve 44 varies strongly within a temperature range of from −75° C. to +50° C. The second ratio indicated by the curve 45, on the other hand, varies strongly with temperature over the range of from about 50° C. to 300° C. Therefore, the particular fluorescent emission lines of the phosphor that are utilized depend upon the expected temperature range to be monitored.

It has been found that the use of various pairs of the rare earth phosphor lines at 5140 (blue-green), 5379 (green) and 6280 (red) angstroms has certain advantages. One advantage is that these three lines are among the more intense lines common to all three oxysulfide hosts (lanthanum, gadolinium and yttrium). This allows a single instrument to be used will all three types of rare earth phosphors, although a different temperature calibration is necessary when the phosphor sensor material is changed. While the 4680 angstrom line is at least comparable in intensity to the 5140 angstrom line, its use with visible pumping involving excitation at approximately 4680 angstroms would make separation of exciting and fluorescent radiation more difficult. Another advantage of this particular set of lines is that they are well separated in wavelength from lines of different temperature dependence and so may be optically separated from the other wavelength emission peaks. Furthermore, these three lines in combination allow a very broad temperature range to be detected. For low temperatures of about body temperature to well below freezing temperature, the sharply changing intensity of the 5140 angstrom line as a function of temperature in this range is ratioed with either of the other lines whose intensity remain essentially the same in this range. For a medium temperature range of from about body temperature to 150° C., the 5379 angstrom line (steep variation) is ratioed with the 6280 angstrom line (essentially flat). For a high temperature range of about 150° C. to 300° C., the same two lines are used as in the medium range except here the intensity of the 5379 angstrom line changes rapidly as a function of temperature while the 6280 angstrom line intensity remains more nearly constant over the high range.

A single instrument capable of operating with various phosphor sensors over the entire range preferably is capable of measuring the intensities of all the above lines and selectively ratioing various pairs depending upon the temperature range of operation. Of course, the particular form of the phosphor temperature sensor utilized for any particular measurement depends upon the object or environment being measured and the temperature range. Several such sensors are described hereinafter.

Referring to FIG. 3, the intensities of two spectral lines for europium-doped gadolinium oxysulfide ($Gd_2O_2S$:Eu) as a function of temperature of the phosphor are shown as emission lines 55 (at 4680 angstroms) and 56 (at 5379 angstroms). In this phosphor material, 0.1 atom percent of europium has been substituted for gadolinium.

The intensity of the 4680 angstrom emission line of europium-doped yttrium oxysulfide ($Y_2O_2S$:Eu) is shown by curve 57 of FIG. 3, where 0.1 atom percent of europium has been substituted for yttrium. The intensity of the 5379 angstrom of the $Y_2O_2S$:Eu line is shown by curve 58. Another line useful for referencing (ratioing) in $Y_2O_2S$:Eu is the 6157 angstrom line represented by curve 59. This line has a temperature dependence similar to the 6280 angstrom line. The curves 55, 56, 57 and 58 show usable temperature dependent emission intensity characteristics in different temperature ranges than those spanned by the lanthanum material exhibiting curves 51 and 52. These additional oxysulfide materials are most usable over the rapidly changing portions of their curves when referenced to a line such as the 6157 angstrom line. The differences with useful temperature ranges of these materials are significant when selecting an optimum material for a specific application. The 5140 angstrom line or the 4680 angstrom line 55 of gadolinium oxysulfide, for example, have particular advantages for medical temperature measurement since especially rapid changes occur with good signal strength over the range of human body temperatures.

It will be noted from FIG. 3 that each of the gadolinium, lanthanum and yttrium oxysulfide materials illustrated has the same doping, namely 0.1 atom percent of europium. However, experiments with materials of widely different doping levels of europium indicate that the temperature dependence are not significantly affected by doping level although absolute values of the ratios of emission line intensities are affected. Hence, it is important to calibrate the temperature measuring instrument for the particular phosphor composition employed. The temperature characteristics of the material are, as can be seen, very dependent upon the phosphor host material, as well as on the choice of activator ion, thus permitting optimization of the temperature characteristics for a particular application by selection of the proper host material.

Referring to FIG. 3A, a typical light intensity output characteristic is illustrated for the rare earth oxysulfide phosphors discussed above. This spectrum is for europium activated lanthanum oxysulfide and is the emission intensity at a particular wavelength line, as a function of wavelength of the radiation exciting the phosphor. It can be seen that the most intensity is obtained when the phosphor is excited with ultraviolet radiation. Ultraviolet radiation is preferred, therefore, for exciting the phosphor in most cases. But some optical systems that might be used to transmit exciting radiation have considerable losses to ultraviolet radiation when compared to losses in the visible range. A long length of optical fiber, such as one over 100 meters in length might be such a system. When the losses are great enough, it may be preferable to excite the phosphor with visible radiation, such as at either the blue or green excitation bands shown on FIG. 3A. Even though the resulting excitation efficiency may be lower for visible than ultraviolet radiation, the improved visible transmission of a long optical fiber can make up for this difference.

In order to adequately detect and measure these spectral line ratios without interference from adjacent emission lines, the fluorescent radiation 41 and 81 of FIG. 1 must first be passed, as part of the block 100, through an optical filter such as a monochromator or interference filter set chosen to isolate the selected wavelength ranges in which the spectral lines of interest fall. It can be seen from the characteristics of the phosphor illustrated in FIG. 2 that for the 4680 angstrom, 5861 angstrom and 6157 angstrom lines, a filter having a bandpass of the order of 50 angstroms is adequate for separation.

In addition to separation, it may also be desirable to correct the measured line intensities within the block 100 for any strong background radiation which may be present, such as that from room light or day light. For that purpose, it may be desirable in certain circumstances to additionally measure the intensity of radiation as seen through the utilized monochromator of filter when tuned to a spectral region near the fluorescent lines but where no fluorescent radiation is expected. An example using the phosphor whose characteristics are illustrated in FIG. 2 is in the region of from 6000 to 6100 angstroms. Alternatively, the background can be determined by turning off or blocking the excitation source and looking through the two filters. Any background radiation so measured can then be subtracted from the 5861 and 6157 angstrom line intensities that are measured to yield a more correct ratio for temperature measurement purposes.

A physical mixture of phosphor compounds can also be utilized, as an alternative, in order to obtain desired temperature characteristics. The intensity of one emission line from one compound of the mixture, for instance, can be compared with the line intensity of another compound in order to provide optimum measuring characteristics over a given temperature range. Alternatively, two emission lines from each of two phosphor compositions can be utilized, the lines from one compound compared over one temperature range and the lines from the other compound being compared over an adjacent temperature range. For example, a terbium doped lanthanum, gadolinium or yttrium oxysulfide may be used as one compound in combination with an europium-doped lanthanum, gadolinium or yttrium oxysulfide as the other compound. Another useful mixture might involve europium activated yttrium or gadolinium oxide mixed with one of the terbium activated oxysulfides mentioned above.

The phosphor materials mentioned above have the advantage of being relatively inert and stable. The emission lines of the phosphor are in the visible or near visible region and thus transmission through long air paths, through water and other liquids, or through long optical fibers, or through glass or quartz optics, is possible. Such a phosphor differs from more conventional phosphors in that it emits very sharp fluorescent lines which can be readily optically isolated from each other, and the temperature dependence of line intensities at a particular wavelength is very strong relative to that at other wavelengths over a given temperature range of practical interest. Other phosphor materials having these characteristics can be utilized as part of the technique and structure of the various aspects of the present invention, as well.

Another form of phosphor having further different emission characteristics is a single host compound containing two different activator elements. An example is uranyl molybdate activated with europium, a phosphor having two activators, triply charged europium ($Eu^{3+}$) and the uranyl ion. The various combinations of the particular rare earth phosphors described previously by way of example are numerous, thus providing a wide range of chemical, physical and radiation emission characteristics for different applications. The flexibility of these techniques is therefore much greater than described since many other phosphors are also available and useful for temperature measurement applications.

Phosphor compounds are usually thought of as solids because that is the most practical form, but they may also be in the liquid or gaseous state if appropriate for different types of temperature measurement. Many of the activators discussed above may be dissolved in an organic liquid or solid, thus also preserving the advantage of being useable in electrically hostile environments. As an example of a liquid compound, a triply charged europium ($Eu^{3+}$) ion (1 wt.%) in polyphosphoric acid with added fluorescein (0.02 wt.%) emits a complex spectrum with separable fluorescence lines each rising from substantially zero to a peak and back to substantially zero again in less than 500 angstroms bandwidth, these lines having emission intensity that independently vary as a function of temperature of the liquid. The intensity of two such lines can be detected and ratioed as discussed elsewhere herein to measure liquid temperature. The particular phosphors identified in this and the preceding paragraph are discussed in some detail in an English language paper distributed by the Plenum Publishing Corporation and dated 1979, stated to be translated from a Russian article by N. N. Morozov entitled "Rare Earth Thermochromic Phosphors" appearing in Izvestiya Akademii Nauk SSSR, Neorganicheskie Materialy, Vol. 15, No. 1, pp. 153-156, January, 1979.

Another variation of the techniques described herein is to provide a phosphor temperature sensor that can measure temperature on a cellular or molecular level. The temperature dependent fluorescence ion is chemically attached to a molecule whose temperature is to be measured as in fluorescent "tagging". An application of this is where the temperature of specific molecules reacting in a solution is desired to be monitored independent of the overall temperature of the solution. Tagged molecules in solution can be excited and the emitted radiation detected and processed as discussed elsewhere herein.

Remote Non-Contact Surface Temperature Measurements

Figure 4:
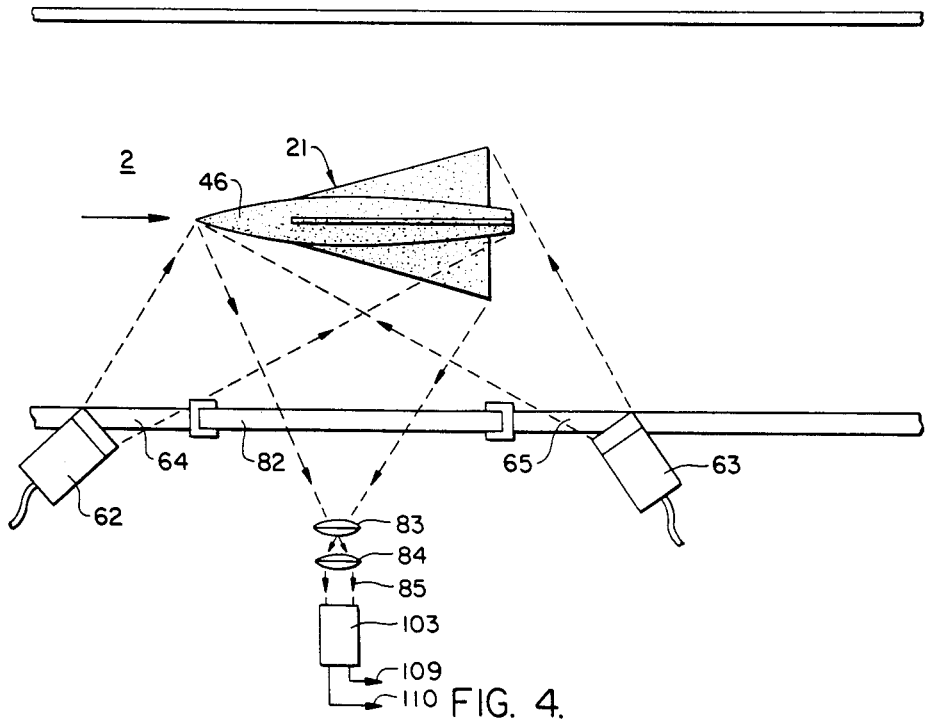
FIG. 4 schematically illustrates one specific form of the present invention wherein the temperature of the surface of a wind tunnel model is remotely measured.

Referring to FIG. 4, an object 21 within an environment 2 has its outside surface painted with phosphor material 46. By monitoring the emission of the phosphor, when properly excited, the surface temperature of the object 21 can be monitored from a remote distance and without contacting the object 21.

In the particular example shown in FIG. 4, the object 21 is an aerodynamic model positioned in an environment 2 that is a test wind tunnel. The surface temperature being monitored on the model 21 provides information as to the effect of the air flow in heating the model surface.

The phosphor painted on the surface of the model 21 is excited to luminescence by illumination from ultraviolet lamps 62 and 63. In some situations, an ultraviolet laser might be used as well, particularly for measurement of selected object points. The ultraviolet output of the lamps 62 and 63 are passed, respectively, through windows 64 and 65 that are transparent to ultraviolet energy so that it might pass into the wind tunnel 2 and onto the model 21. Another window 82 permits emitted radiation from the phosphor on the surface of the model 21 to be gathered by an optical system, represented by lenses 83 and 84. The collected radiation 85 is then directed onto a filter and detector system 103. The filter and detector 103 is similar to the filter and detector 100 previously described with respect to FIG. 1.

Figure 5:
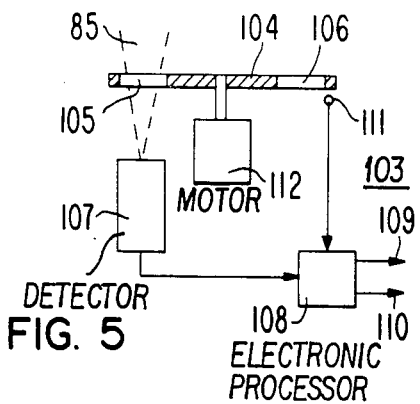
FIG. 5 shows one specific form of an optical detector 103 of the temperature measuring system of FIG. 4.

Referring to FIG. 5, details of one form of the filter and detector 103 are illustrated. A filter wheel 104 is positioned in the path of the radiation 85 from the phosphor. The wheel 104 has at least two different filters 105 and 106 spaced on different areas of the wheel 104 so that as it is rotated by the motor 112 the filters 105 and 106 are alternately passed through the beam 85. The filters 105 and 106 are designed to be narrow bandpass filters to select out two different spectral lines of the phosphor being utilized.

The two selected phosphor emission lines are thus applied in time sequence to a detector 107 whose output is applied to an electronic circuit 108. The detector could be a photomultiplier or a silicon photo-diode which would give only an average of the intensity of the particular selected lines over the entire object 21 or the detector 107 could be some other device, such as an image dissector or a television camera, that would convert the optical image of the object 21 as viewed by the selected emission lines into a two dimensional intensity plot. The use of the latter type detectors has an advantage of permitting temperature detection on each point of the object 21 separately. The electronics 108 receives a synchronous signal from the detector 111 which tells it which of the two filters 105 and 106 are in front of the detector 107 at any instant. This permits the electronics 108 to develop the two signals 109 and 110 representative, respectively, of the intensities of the two selected emission lines of the phosphor.

Figure 6:
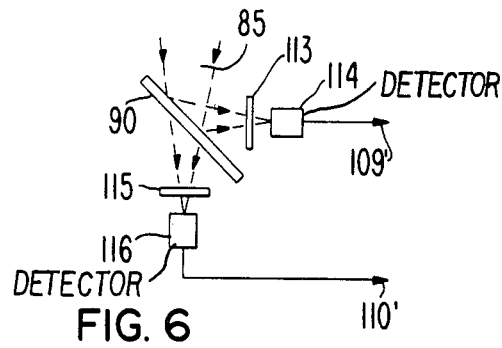
FIG. 6 shows another specific form of an optical detector 103 of the temperature measurement system of FIG. 4.

FIG. 6 shows another form of the filter and detector 103 of FIG. 4. In the form of FIG. 6, a beam splitter or dichroic mirror 90 is positioned in the path of the phosphor fluorescent emission beam 85 so that known fractions of the intensity of the beam go in each of two directions. One direction is through a filter 115 and onto a single detector 116 to develop an electrical signal 110'. The other path is through a filter 113 onto a second detector 114 to develop a signal 109'. Each of the filters 113 and 115 are selected to permit one or the other of two selected emission spectral lines to pass therethrough and onto their respective detectors. The output signals in the lines 109 and 110 of FIGS. 4 and 5, and 109' and 110' of FIG. 6, are applied to appropriate signal processing and readout circuits as described with respect to blocks 120 and 140 of FIG. 1. The read-out device would depend, of course, upon the type of detector used, being a television display system or video storage medium if the detector 107 is a television camera.

Remote Point Temperature Measurement

There are many applications of large machinery and apparatus wherein it is desired to monitor the temperature at one or more points within the apparatus while it is operating. Large machinery is especially expensive. It is very inconvenient and expensive when it breaks down due to local overheating. If such local overheating can be detected before any damage is done, then the cause of it can be determined, thus avoiding more costly shutdowns of the equipment. Monitoring the overall or average temperature of the equipment, by monitoring the temperature of water or coolant, for instance, does not provide the necessary information in most instances because the overheating could be raising the temperature of a small part of the machinery to an excessive and damaging level without raising the average temperature any detectable amount.

One such piece of equipment wherein there has been a long need for such point temperature measurement is in power transformers, some of which are capable of handling several megawatts of electrical power. Destruction of such a large piece of equipment is not only extremely costly but can significantly disrupt a large portion of an electric power distribution system. The problem has not been satisfactorily solved before since high voltage transformers and other high voltage electrical equipment, cannot tolerate electrical sensors and conductors within the equipment. The oscillating fields generate currents, noise signals and spurious heating in such conductors. In addition, the conductors provide a mechanism for producing disastrous short circuits. There is thus a need for a non-metallic temperature sensor that can be used inside of electrical power transformers and other types of electrical equipment.

Figure 7:
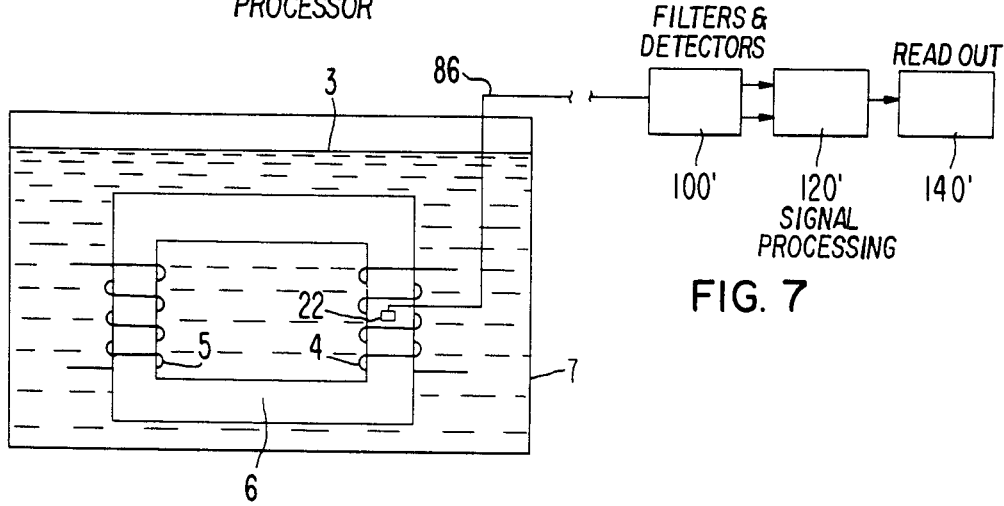
FIG. 7 schematically illustrates a large electrical power transformer utilizing one aspect of the present invention for remotely measuring spot temperatures thereof.

Referring to FIG. 7, such a transformer is very generally illustrated. An outer shell 7 contains a transformer core 6 having windings 4 and 5 therearound. The entire core and windings are submersed in an oil bath 3 for insulation and cooling. In order to monitor the temperature of a given spot on the interior of such a transformer, a single sensor 22 is provided in accordance with another aspect of the present invention. The sensor 22 is connected to one end of an optical fiber bundle 86. The sensor 22 may be constructed without any metal parts at all and is optically connected by the fiber bundle 86 to an appropriate filter and detector system 100', an electric signal processing circuit 120' and a direct temperature read-out device 140'.

Figure 8:
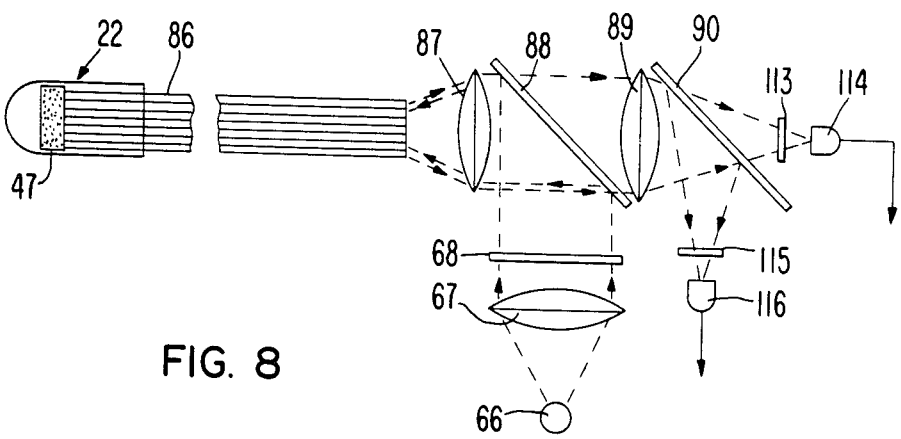
FIG. 8 shows a phosphor temperature sensor and optical system therefor as one form of the temperature measurement system of FIG. 7.

Referring to FIG. 8, the temperature sensor 22 is shown in cross section wherein it contains a phosphor material 47 in optical communication with one end of the optical fiber bundle 86. This end of the optical fiber and the phosphor form a probe which may be inserted into a transformer or other machinery. The probe is subjected to the temperature to be measured and the phosphor, being part of that probe, responds as described hereinbefore with relative changes in the intensity of its spectral output lines as a function of temperature.

The output of the phosphor 47 is obtained at an opposite end of the fiber bundle 86 by a lens 87 which directs the emission radiation through a beam splitter or dichroic mirror 88, through another lens 89, and thence to a system already described with respect to FIG. 6, including a beam splitter or dichroic mirror 90, two filters 113 and 115 and two radiation detectors 114 and 116.

In order to excite the phosphor 47 to emit the desired lines, the embodiment of FIG. 8 employs an ultraviolet light source 66 whose output is directed by a lens 67, passed through a broadband ultraviolet filter 68 which blocks all but the ultraviolet light and then onto the beam splitter or dichroic mirror 88. The element 88, if dichroic, is designed to transmit visible light but reflect ultraviolet light so that the optical configuration shown in FIG. 8 utilizes such a characteristic to advantage. The ultraviolet radiation is reflected by the element 88, directed through the lens 87 into the optical fiber bundle 86 and transmitted through it to the phosphor material 47 to excite its luminescent emission which provides the temperature information in a coded form, as described above.

Ultraviolet excitation can be employed with optical fibers when the fiber is less than 100 meters or so in length because of relatively strong absorption or scattering of ultraviolet radiation by the fiber itself. Further, the level of ultraviolet radiation reaching the phosphor is preferably less than that level which drives the phosphor into saturation. If below this level, the temperature dependent phosphor emission is independent of the intensity of excitation radiation, thus advantageously eliminating a variable that would otherwise affect interpretation of the temperature information.

It has been found that a tungsten-hologen lamp may be used for the light source 66 of FIG. 8, rather than more conventional sources of ultraviolet radiation. This source has the advantage that its output in the ultraviolet range is adequate and yet small enough to maintain the phosphor excitation level below saturation, although the large intensities present at longer wavelengths must be filtered out. Such a lamp has the further advantages of being small in size, inexpensive, readily available in small power ratings, easy to control, and relatively low in heat disipation. Such a lamp is therefore especially advantageous for small and/or portable instruments and short fibers.

Referring to FIG. 8A, a modification of the system of FIG. 8 is shown wherein a probe 27 of a type similar to probe 22 of FIG. 8 is excited by connection through a fiber optic 86' to an excitation source 60'. The radiation from the phosphor within the probe 27 is carried by a separate fiber optic 86" to the appropriate filters and detectors 100". The fiber optics 86' and 86" may be a single optical fiber each, or may be a bundle of fibers. The use of the separate fiber optics 86' and 86" has a principal advantage of providing optical isolation between the phosphor excitation radiation and radiation given off by the phosphor. Excitation radiation as well as possible low level fluoresence from the optical fiber itself is thus kept clear of the detector 100". The result is less optical background noise and improved accuracy. The excitation source 60' and detector 100" may also be more easily physically isolated using the bifurcation scheme.

Another advantage of these remote temperature measurement techniques over more conventional thermocouple techniques is that the phosphor sensor may be remotely tested to assure that the temperature sensor is working satisfactorily. This can be done by periodically obtaining the emission spectrum of the phosphor. If no expected lines are absent and if no new emissions are present, then it is confirmed that no chemical or other change has taken place and that the sensor is in proper working order. This fail-safe feature could be of particular importance in nuclear reactor systems.

FIG. 9 shows a variation of the probe and detecting system of FIG. 8 wherein a probe 23 includes a phosphor material 48 attached to one end of an optical fiber bundle 91. Encapsulated within the probe 23 in this embodiment is a radioactive material 69 which is selected to excite, for a period of time dependent upon the half-life of the material 69, the phosphor material 48. The emission of the phosphor material 48 is transmitted through the optical fiber bundle 91, through a lens 92 and onto a beam splitter, filter and detector system as described previously with respect to FIGS. 6 and 8. The radioactive material 69, used in place of the ultraviolet source 66 of FIG. 8, may be, for example, an isotope of nickel, such as $_{63}Ni$, having a half life of 92 years. This material emits electrons but does not emit gamma rays. This probe 23 and communicating optical fiber bundle 91 still may maintain the desirable characteristic of having no metallic component if the $_{63}Ni$ is in the form of an oxide or other non-metallic compound.

FIG. 10 shows a variation of either of the probe assemblies of FIG. 8 or 9 wherein a single optical fiber bundle 92 provides optical communication with a plurality of separate probes, such as the probes 24, 25 and 26, which can be positioned at different locations within a power transformer or other apparatus. At one end of the optical fiber bundle 92, a few of the fibers are connected with each of the individual probes 24, 25 and 26. At the opposite end of the fiber bundle 92, the opposite ends of the same optical fibers are connected to individual filters and detectors. That is, the probe 24 is in optical communication with only the filter and detector block 117, the probe 25 only with the filter and detector block 118, and so forth. Each of the assemblies 117, 118 and 119 contains a complete and independent optical source, filter and detector system sufficient to generate and present output signals for the two wavelengths of interest to a common electronic processor 122 which in turn obtains the ratio. Alternately, each of the blocks 117, 118 and 119 can obtain the ratio and transmit to the processor 122 only the ratio signals. In either case, the processor preferably utilizes common processing circuitry to sample the signals from the blocks 117, 118 and 119 and apply these samples to a temperature display 141, rather than independently processing each signal with separate dedicated circuitry.

Figure 10A:
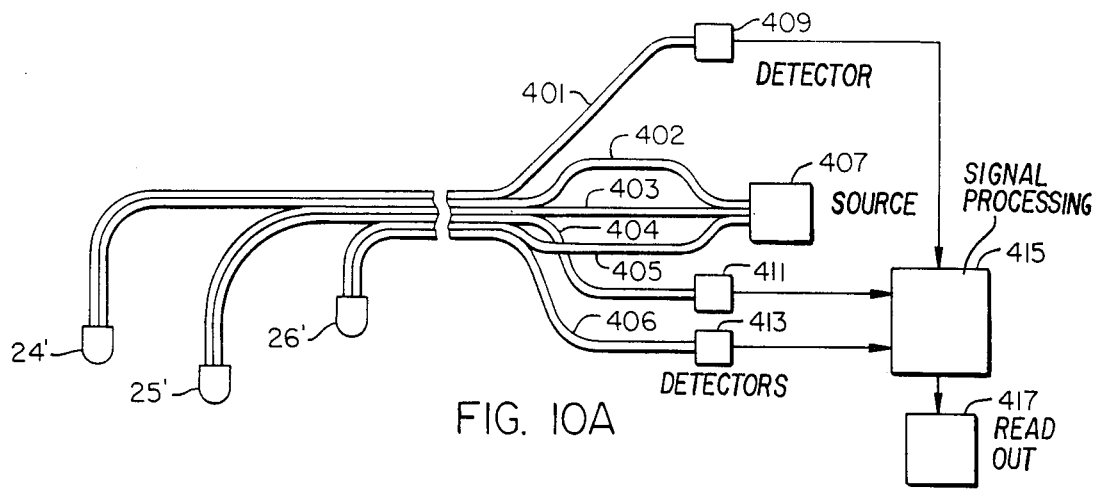

A variation of the multiple probe system of FIG. 10 is shown in FIG. 10A wherein a time division multiplexing technique is employed. Multiplexing of signals from separate temperature sensors has the significant advantage of permitting a single instrument package to be utilized with many sensors. Referring to FIG. 10A, temperature sensors 24', 25' and 26' are connected through separate radiation transmission optical fibers 401, 404, and 406, respectively, to individual dedicated detector assemblies 409, 411 and 413. A source of excitation radiation 407 and appropriate optical system direct ultraviolet or other exciting radiation along optical fibers 402, 403 and 405 which are connected at their opposite ends respectively to the temperature probes 24', 25' and 26'. Each of the detecting stations 409, 411 and 413 is designed with appropriate filters to independently detect the intensity of radiation received from its respective probe within the two narrow radiation bands of interest. This may be accomplished, for example, by the optical and detector arrangements of FIGS. 5, 6 or 8. The electrical outputs of the detecting stations 409, 411 and 413, proportional to the intensity of radiation within the two wave-length bands from each of their respective probes, are applied to an electronic circuit 415 which determines the ratio of intensities from each probe, and thereby their temperatures. The signal output of the electronics 415 is applied to a temperature display 417 which indicates the temperatures of each of the temperature probes 24', 25' and 26'. The electronic circuit 15 includes an appropriate electronic switch that alternately connects to the signal line outputs of the detecting stations 409, 411 and 413, in time sequence. This permits a common electronic processing circuit to handle the signal processing necessary from all three temperature probes.

As an alternate to the system of FIG. 10A, the common ultraviolet source 407 and the respective separate optical phosphor exciting fibers 402, 403 and 405 may be omitted. In their places, a beam splitter can be employed at the end of each of the radiation receiving fibers 401, 404 and 406 as part of their respective detecting stations, corresponding to the beam splitter 88 of FIG. 8. As in that embodiment, a source of ultraviolet light could then be optically directed to each beam splitter, so that the same optical fibers are utilized for excitation of the phosphor and for transmitting radiation from the phosphor back to the detecting station.

The electronic circuits 415 can include as complicated and advanced signal processing equipment as desired. For example, a digital data storage system may be employed that allows sampling, integration and display of the data from any of the probes, allowing the data to be built up to whatever depth is desired in terms of a signal-to-noise ratio.

Alternatively, the separate probes can be scanned at the output end of the fiber optic bundle by a single detector station in a controlled and predetermined fashion, as shown in FIG. 10B. A single detector assembly 414 is positioned for being optically connected in sequence, one at a time, to ends of optical fibers 401', 404' and 406'. Such an optical coupling is provided in this specific example by a hexagon-shaped mirror assembly 421 that rotates about its axis. Each mirror surface alternately optically connects the detecting station 419 with each of the optical fiber ends, so that an output signal applied to an electronic circuit 425 may be appropriately processed in order to display all three temperature signals on an appropriate display 427. A rotary position sensor 423 emits an electrical signal which is also utilized by the electronic circuits 425, as an indication of position of the mirror assembly 421. This position signal then tells the electronics 425 which of the optical fibers 401', 404' or 406 which is optically coupled by a mirror surface to the detector station 414. The detecting assembly 414 may be of the type described previously employing two separate detectors and appropriate filters for directing each of the phosphor output lines to a separate detector.

A means for exciting the phosphor of the temperature probes is not illustrated in FIG. 10B, but may be one of several previously described types. If radiation must be sent down an optical fiber to the probe end, it may be done so in a manner illustrated in FIG. 10A, wherein a common ultraviolet source 407 is employed. Alternately, each of the fibers 401', 404' and 406' may be provided with a beam splitter which allows the ultraviolet energy to be sent down the same fiber or fibers transmitting the radiation emitted from the phosphor back to the detecting station. A preferable arrangement, however, would be to use a single ultraviolet source that is positioned with respect to the detecting station 414 of FIG. 10B which uses the mirror assembly 421 to alternately send ultraviolet radiation into the end of the optical fiber to which the detector at that instant is being optically coupled. This has an advantage of requiring less ultraviolet radiation power, since only one phosphor probe would be illuminated at any one time, rather than all probes.

The single detecting station embodiment of FIG. 10B has the advantage of eliminating any variation between channels which might be due to different detector characteristics in a multi-detector array. On the other hand, the multi-detector approach of FIG. 10A has the advantage of not requiring any moving optical parts and allowing data to be accumulating from all probes all the time. In each of these embodiments, of course, a different number of temperature sensing probes may be employed other than the three chosen for illustrative purposes. In the common detecting station embodiment of FIG. 10B, each of the probes utilized with it must have the same phosphor characteristics, so that they they can all work with a common detecting station 414.

FIG. 10C shows a variation of the optical scanner of FIG. 10B. A mirror system 421' is rotated about an axis 418 by a motor 420. Mirrors 422 and 424 are held within the rotating housing 426 at a 45° angle with the axis 418. A lens 428 is mounted in the rotating housing for scanning in time sequence a plurality of optical fiber ends, such as the fiber 401" shown. The mirror system thus presents light signals in time sequence from a plurality of optical fibers to a common position along the axis 418 to be detected by the detector 419'. The motor 420 is preferably a stepper motor that rotates the system 421' from one optical fiber to the next after holding the assembly 421' fixed on each optical fiber for a selected signal integration time. This avoids wastage of measurement time between detectors as would be the case with a continuously rotating system.

Frequency multiplexing techniques may alternatively be employed. The optical signal from each sensor may be chopped (modulated) at a unique frequency and all converted to electrical signals by illuminating a common detector. The phosphor emission electrical signals from the detector are then separated by appropriate electronic filtering or demodulation techniques according to the unique carrier frequency of each probe.

Obviously, the specific types of equipment where such multiple temperature probes have utility are numerous. An electric power generating nuclear reactor is an example of a system where the invention can be used with great advantage to measure temperature of remote, inaccessible positions. Various industrial processing or manufacturing plants also can utilize these techniques with advantage.

Moving Objects or Materials

The techniques of the present invention lend themselves to optical commutation regardless of the specific type of phosphor utilized. They may be applied without physical contact and are immune to electrical noise. A specific application of optical commutation is on a rotating device 200 as shown in FIG. 11. This device could be a motor, turbine or generator. The phosphor containing probe 22 is embedded in the rotating part 200 as are an optical fiber input bundle 201 and an output bundle 203. The optical fiber bundles terminate at an external circumference of the wheel or rotating part 200. This permits the non-rotatable fixed positioning of an exciting radiation source, such as an ultraviolet source 205, and phosphor emission receiving optics 207 adjacent thereto. At one position, for a short distance, in each rotation of the rotating part 200, the ultraviolet source and the phosphor emission radiation optics 207 will be aligned with their respective optical fiber bundles 201 and 203. At that instant, the temperature of the part at the position of the embedded phosphor containing probe 22 is measured. The optical system 208 is connected with an appropriate filter and detector 209 of one of the types discussed with respect to other of the embodiments above.

The same technique can be utilized, as shown in FIG. 12, for a moving belt 211. This optical temperature measurement technique can be seen to have considerable advantages since no physical connection of wires or other devices are required between the moving part and the fixed measuring equipment. As an alternative to the particular optical technique shown in FIGS. 11 and 12, the rotating part 200 and the belt 211 could also be painted with a phosphor paint as discussed with respect to FIG. 4.

It will be noted from FIGS. 11 and 12 that multiple sensors can be employed to detect the temperature at different locations on the object. Optical fibers could then be connected to each of these additional sensors in the manners shown in FIGS. 11 and 12, but terminated at the edge of the moving object at different locations. The detecting and illuminating stations would then in effect be operating in a time multiplex mode, similar to that described previously with respect to FIGS. 10A and 10B.

Another alternative to what is shown in FIG. 11 is to position the optical fibers to communicate over the gap at or very near the axis of rotation of the rotating object. This has an advantage of increasing the duty cycle of temperature measurements.

Fluid Temperature Measurement

Referring to FIG. 13, yet another application of the basic concept of the present invention is shown wherein the temperature of a moving stream of fluid 215 passing through a pipe 217. A window 219 is provided in the wall of the pipe 217 and characterized by transmitting the exciting and emitted radiation without significant attenuation. An appropriate exciting electromagnetic energy source 221 illuminates the interior of the pipe through the window 219. The fluid stream 215 is provided with a plurality of phosphor coated particles 223 that have a size and density consistent with the type of fluid 215 and flow to be expected so that they remain distributed within the fluid stream 215. The radiation from the ultraviolet source 221 causes the phosphor coating on the particles 223 to luminesce and this luminescence is gathered by an optical system 225 which collects and transmits the phosphor radiation to an appropriate detector 227. By detecting and ratioing the intensities of two phosphor emission lines of interest, the temperature of the fluid stream 215 is determined since the particles have been given a chance to reach a temperature equilibrium with that of the fluid stream 215. Alternatively, but with some disadvantage, a single phosphor emission bandwidth only may be detected without ratioing, such as is possible with a conventional thermographic phosphor.

Each of the particles 223 is chemically inert, with regard to its interaction with the fluid in which it is used and also, of course, with the phosphor material which is attached to it. Another arrangement is the encapsulation of the phosphor within an optically transparent, chemically inert medium. For the embodiment of FIG. 13, it may also desirable, as shown, to provide a large number of particles to have a distribution of specific gravities so that they maintain a distribution throughout the fluid stream 215, as shown.

Another particular application of the immersed bead technique is shown in FIG. 13A wherein a container 231 contains a body of liquid that is not moving. Within the liquid are a plurality of beads 233. The container 231 could be a clinical laboratory cuvette, for example, wherein it is desired to maintain the liquid at a particular precise temperature while monitoring a chemical reaction taking place. The container 231 illustrated in FIG. 13A should be optically clear at the wavelengths of light utilized so that exciting radiation may be transmitted to the beads 233 and the resulting luminescence transmitted back out to an appropriate detector, according to previous discussions. Alternatively, the specific gravity of the beads 233 may be made all the same as that, rather than being distributed throughout the height of the liquid within the container 231, they are caused to all sink or all float to the top. This would have an advantage of allowing excitation and viewing of the luminescence radiation either from the above the liquid surface or from the bottom of the container.

Rather than solid temperature sensors, a liquid phosphor temperature sensor may be added to the body of liquid whose temperature is to be measured. Such liquid temperature sensing material has previously been described. It can be provided with a specific gravity relative to that of the body of liquid to be measured so that it floats on top, sinks to the bottom or is distributed throughout the liquid.

Further Sensor Configurations

A further application is illustrated in FIG. 14. The end of an optical fiber bundle 301 is capped with a disposable temperature sensing sleeve 303. The sleeve 303 is formed of a cylindrical base portion 305 that is carried at the end of the optical fiber 301. One end of the cylindrical base 305 is capped with a thin, heat conductive cap 307 such as, for example, one made of metal. The cap 307 may, on the other hand, simply be thin plastic as a unitary part of the cylindrical portion 305. A preferable technique for forming a unitary cover 305/307 is by plastic injection molding. On an inside surface of the cap 307 is a phosphor coating 309. At the other end of the fiber optics 301 (not shown) is an excitation source and detecting system of a type described earlier. The end of the optic fiber 301 with the sleeve 305 is immersed in the environment for which a temperature is desired to be taken, such as a human or animal cavity, or liquid baths. If the cap portion 307 is not optically opaque, then, if required, a coating of light blocking material (not shown) may be placed on the outside of the probe cover 303 over the portion 307 and along the base portion 305 far enough to prevent extraneous light from entering the optical fiber 301 and undesirably affecting the temperature measurement.

The advantage of the sleeve 303 is that it may be discarded after a single use, thus preventing cross contamination from occurring in sequential temperature measurements. The comparing or ratioing of the two wavelength band signals as described earlier permits sleeves to be interchanged without having to re-calibrate the detector and display instrument between sleeves. A significant advantage of using the present invention for this type of measurement is that it has a very low thermal mass, resulting in the temperature indicating phosphor 309 reaching a steady state value of the temperature of its surroundings very quickly. It will also be noted that the phosphor 309 need not be held tightly against the end of the optical fibers 301, since an air gap can be traversed by these techniques. Precise positioning of the probe cover on the optical fibers 301 is thus unnecessary. The other advantages described above concerning the phosphor and optical fiber structure generally are present here as well. This technique is especially adapted to be embodied as a clinical thermometer for use to measure the temperature of patients in replacement of the slower electronic thermometers now becoming widely used in hospitals.

A closed end 306 of a modified probe cover 304 is shown in cross-section in FIG. 14A. The cover 304 is made as a single piece injection molded plastic. A primary difference with the probe cover 303 is that the cover 304 has no phosphor layer applied on its inside closed end surface. Rather, phosphor particles are contained in the plastic tip itself. The end 306 must thus be substantially transparent to the exciting and emitted radiation between the inside of the cover 304 and the phosphor particles embedded therein. A substantially light opaque coating 308 may again be provided on the outside of the cover 304, if necessary, in order to prevent an undesireable level of optical radiation within or near to the fluorescent emission bands being detected from entering the end of the fiber optics 301.

Yet another application utilizes the probe and optical fiber embodiment of the present invention implanted at one or more points within humans and animals. A potential application is illustrated in FIG. 15 wherein a human or animal body 311 contains a cancerous tumor schematically shown at 313. A technique presently being explored for treating cancer, called induced hyperthermia (heating), involves irradiating the tumor 313 by means of energy 315 from an ultrasonic or electromagnetic radiation source 317, the result being induced heating. However, the success of this technique for treating the tumor 313 is dependent upon maintaining the tumor at a specific, well controlled elevated temperature for a particular time.

Therefore, a means of monitoring and controlling the temperature of the tumor 313 is to introduce surgically, with a hypodermic needle or via a catheter a small fiber optic temperature probe 319 of the type discussed with respect to FIG. 9 above and FIG. 16 hereinafter. An optical fiber 321 communicates between the temperature probe 319 and excitation and detection apparatus 323. For this application, of course, the size of the temperature probe 319 and cross-sectional dimension of the optical fiber 321 needs to be as small as possible. The optical fiber 321 can be limited to one or two fibers and the temperature probe 319 can be formed by coating the phosphor and a thin encapsulating material directly onto the end of the optical fibers. The sensor end of a single optical fiber preferred for implanting in humans is described with respect to FIG. 16 hereinafter. The temperature of the tumor 313 can then be monitored and the intensity of radiation from the source 317 adjusted to maintain the optimum temperature for treatment. If heating of the tumor is accomplished by radio frequency or microwave radiation, the optical probe is insensitive to directly induced heating or electrical noise pick-up by these fields. Such would not be the case with a more conventional electrical metallic sensor system. The low thermal mass of the small fiber sensor assures that it will quickly assume the temperature of its environment as that temperature changes. The fiber does not conduct heat so that the sensor does not draw heat away, changing the temperature. Being non-metallic, the sensor and fiber do not distort the heating pattern of the radiation field.

It is desired in hyperthermia cancer treatments that the temperature around the tumor 313 be monitored at a plurality of points, as illustrated in FIG. 15A. In that arrangement, a plurality of single optical fiber lengths 327, 329, 331 and 333 have their phosphor coated ends implanted within the patient in the area surrounding or within the tumor 313. Each of the lengths of optical fiber 327, 329, 331 and 333 is made to be a maximum of a few meters long, and is constructed at its free end that is implanted in the patient according to view of FIG. 16. The opposite ends of these fiber lengths are connected by appropriate commercially available optical connectors 335 to a detecting station. Nothing else need be provided along the optical fiber between its ends. One form of detection station that is applicable is described with respect to FIG. 8 wherein the system there shown would be duplicated for each of the optical temperature sensors 327, 329, 331 and 333. Since the exciting radiation is at a different wavelength than the fluorescent radiation, a single optical fiber can be used to transmit both. The single fiber configuration allows a very small probe which is important in human applications. In order to reduce the cost and complexity of the detecting station, a multiplexing system along the lines of that described with respect to FIG. 10B or 10C may be preferable, utilizing the version of those systems that transmit both the exciting and emitted radiation in opposite directions along the same optical fiber.

Each of the optical fiber sensors 327, 329, 331 and 333 are preferably constructed to be disposable, so that new, sterile optical fiber sensors may be implanted in each patient. For that reason, it is desired that they be inexpensive and easily connected and disconnected from temperature instrumentation through their connectors 335. Of course, a lesser or greater number of temperature sensors may be utilized. Alternately, fiber sensors may be reused after sterilization, but in this case also easily interchangability and permanency of calibration are important.

Figure 16:
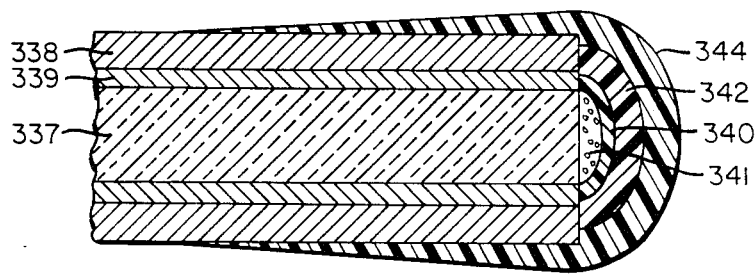
FIG. 16 shows an enlarged optical fiber end forming a temperature sensor.

The free end of each of the temperature sensing fibers 321, 327, 329, 331 and 333 is indicated generally in FIG. 16. The fiber core 337 is surrounded by plastic cladding 339 which in turn is covered by an opaque sheath 338. The goal is to make the diameter of the overall structure as small as possible for implanting in a patient. An overall diameter of the probe of less than 1 millimeter and preferably approximately ½ millimeter is desirable.

Figure 16A:
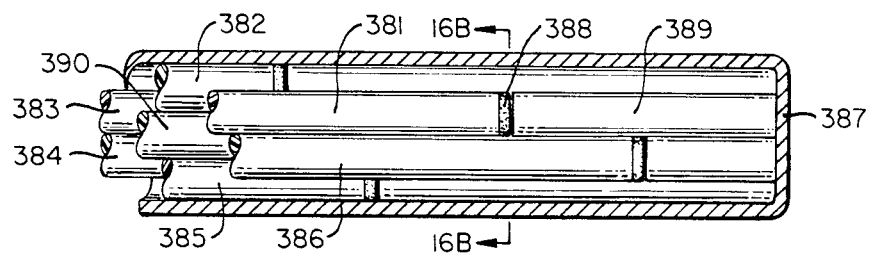
FIGS. 16A and 16B illustrate a multi-sensor fiber optic probe.
Figure 16B:
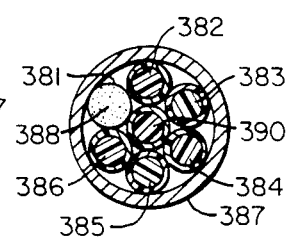

A multi-sensor probe is shown in FIGS. 16A and 16B. Seven optical fibers with cladding but without a sheathing are held together within a common sheath 387, six fibers 381, 382, 383, 384, 385 and 386 surrounding a center fiber 390. Each of these optical fibers is terminated at a different position along the length of the probe. For example, the fiber 381 has a phosphor sensor 388 attached to it and another piece of fiber 389 is positioned between the sensor 388 and the end of the probe to maintain a uniform diameter. Each of the other outside optical fibers 382, 383, 384, 385 and 386 is similarly terminated at a different and unique position along the length of the probe, thus obtaining a temperature profile therealong. The center optical fiber 390 can be inactive or alternatively have a phosphor sensor attached at its end next to the sheath 387 at the extreme end of the probe. With current optical fiber technology, the probe can be made less than one millimeter in diameter. Of course, a greater or lesser number of optical fibers may be employed but six surrounding a center optical fiber, where there are all of the same diameter, provides a very compact probe. The radiation emitted by the phosphor sensors is detected at the opposite ends of the individual optical fibers according to one of the techniques discussed earlier for multiple sensors.

Referring again to FIG. 16, a spot of phosphor 341 is held by an appropriate binder to the end of the optical fiber core 337. Overlaying the phosphor layer 341 is a reflecting layer 340 which in turn is covered by an opaque layer 342 that prevents stray light from inadvertently entering the fiber 337 and interfering with the accuracy of the resulting temperature measurement. A physically tough protective layer 344 surrounds the end of the fiber and the temperature sensor. Preferred materials are: potassium silicate or silicone resin for the phosphor binder in the layer 341; titania in a silicone resin binder for the reflecting layer 340; various transition metal oxides, such as the combination of chromic oxide, copper oxide and molybdenum oxide sold by Ferro Corporation as their V302 black pigment, mixed in a plastic or silicone resin binder to form the light barrier layer 342; and a thin but hardy plastic coating for the outer layer 344. This particular combination avoids electrically conductive materials, particularly metals and carbon black pigments, for applications in electrostatic or electromagnetic fields.

Each of the temperature sensors in the probe of FIGS. 16A and 16B is formed in the manner described with respect to FIG. 16 except that the outer layer 344 is omitted from each. The probe of FIGS. 16A and 16B allows a linear distribution of sensors to be positioned through an object, such as a biological tumor, with a single probe, thus reducing the number of needles or probes that need to be inserted. The positioning of two such multi-sensor probes at right angles to each other allows the acquisition of two-dimensional temperature profiles.

While the cancer application of hyperthermia is currently of the greatest interest, there are potentially various other applications for induced heating in human or animal bodies as well. Sensors of the types described can also be used for other human temperature measuring purposes, such as during surgery or in thermodilution catheters. And the structure of FIGS. 16, 16A and 16B have a wide variety of non-medical applications as well.

Particular types of temperature dependent phosphor carriers which have a wide variety of uses are illustrated in FIGS. 17, 18 and 19. Referring initially to FIG. 17, a small piece of a substrate material 343 is the carrier for a quantity of phosphor material 345 of the type discussed previously, which is held by a binder onto the surface of the substrate 343. On an opposite surface of the substrate 343 is optionally provided an adhesive layer of material 347. The result is a convenient temperature sensor 349 which can unobtrusively be applied to the surface of a container 351, as shown in FIG. 18, or other object whose temperature is desired to be monitored. The size of the sensor 349 may be small, if desired—e.g., one square inch or less.

The temperature sensor 349 is most easily formed as one of a large number in a sheet. A larger sheet of substrate material, such as Mylar plastic or a metal foil, can be perforated to permit tearing apart individual sensors such as sensor 349. The phosphor and binder material, in liquid form, is coated onto one side of the sheet and allowed to dry. Likewise an adhesive is coated on to the backside of the same sheet, either before or after application of the phosphor. When the phosphor binder dries, the sensor 349 is formed and the large sheet of such sensors is then stored until use of one or more is desired, when they are then removed in the same way as a postage stamp is removed from a sheet of stamps. A protective layer for the adhesive 347, such as wax paper, may alternatively be applied as well in order to preserve the adhesive until it is ready to be used, at which time the protective layer (not shown) is removed.

Such a sensor 349 when applied to the bottle 351 is excited and detected in a manner shown briefly in FIG. 18 but described in more detail previously. A source 353 of radiation illuminates the phosphor on the sensor 349. The emitted radiation intensity within the desired bandwidth regions is detected by an assembly 355, in order to determine the temperature of the phosphor and thus the temperature of the bottle 351 with which the phosphor is in a heat conductive relationship.

Referring to FIG. 19, a modification of the sensor of FIG. 17 is shown wherein the substrate 356 is itself provided with the phosphor particles embedded therein, as described with respect to the tip 306 of the temperature probe 304 of FIG. 14A. The substrate 356 is thus preferably made of an optically clear plastic material. An adhesive layer 357 is applied to one side of the substrate and a protective layer 359 is attached to the adhesive, such as wax paper, for easy removal just prior to attachment of the temperature sensor to the object whose temperature is to be monitored.

The temperature sensors of FIGS. 17 and 19 are easily manufacturable at low cost in large quantities. They thus may be disposed of after a single use. The phosphor material is conveniently placed very close to and in heat conductive relationship with the surface whose temperature is to be measured. The applications of this technique are almost endless, one application being in a clinical laboratory where the temperature of a test tube or other sample holding device needs to be monitored in order to keep it within pre-determined limits while a chemical reaction or biological growth is allowed to proceed. Food processing is another application wherein food containers are heated, possibly by microwave radiation. The temperature sensor substrate may be removed from the container after the processing is completed and discarded, no trace of the use of the temperature sensor being left on the container. Or the sensor may be left in place permanently.

As discussed extensively previously, a preferred phosphor for the embodiments of FIGS. 14 through 19, and those discussed hereafter, is one characterized by radiation emission intensity variations in optically separable bandwidths as a function of temperature that are independent of one another so that a ratio or other comparison of the intensities gives the desired temperature indication. But these phosphors or the more conventional thermographic phosphors can also be used, if desired, in these unique approaches to temperature measurement without the ratioing of two emission intensities. In such a case, the intensity of the entire emission spectrum of the phosphor, or of a portion of it, is a direct indication of temperature, with the added requirement that the user calibrate the detector instrument for varying excitation radiation intensities, optical path absorption, and similar changes over time that the ratioing technique eliminates as concerns. Although it is more difficult to utilize the single bandwidth technique (the level of excitation must be carefully controlled during a particular temperature measurement and the device re-calibrated between measurements), there may be some applications where these disadvantages must be accepted. Even the monitoring of emission frequency shift, decay time, or some other temperature dependent characteristics of phosphor may be utilized in the unique temperature sensor configurations disclosed herein.

Other Applications

The techniques of the present invention also have application for point temperature measurements in clinical, chemical, materials and food processing systems. The advantage of an optical fiber and temperature probe system as described herein in such applications is that they are chemically inert, have a fast response time, provide electrical isolation, can be permanently calibrated, are of low cost, are sterilizable and can even be used in moving machinery. These sensors can also be used to measure temperature of materials undergoing microwave heating or curing, an application where a thermocouple or any other metallic temperature measuring apparatus cannot be easily used for reasons discussed earlier.

A particular further application takes advantage of the fact that a direct physical contact need not be maintained with an object under measurement. In such applications, a dot of phosphor can be placed on each package and the temperature thereof monitored by monitoring the emissions of the phosphor when excited in the manner discussed above. A flexible plastic bag 361 is illustrated in FIG. 20 as having a phosphor dot 363 affixed to a surface of the bag by an appropriate binder, or alternatively, the phosphor may be suspended in an optically clear bag wall. In one application the bag might contain food being processed. After processing, the food bag may be sold to the consumer of its contents who may then throw the bag away.

Another of many such applications is illustrated in FIG. 20A. A container, such as a small disposable plastic clinical laboratory cuvette 365, has a phosphor dot 367 printed directly thereon for temperature monitoring of the container and its contents during clinical tests. Such containers might be reused after washing and sterilization, in which case the integrity of the phosphor temperature sensor should be maintained, or they might be discarded after each use. Such laboratory sample containers could also be plastic bags as discussed in connection with FIG. 20.

The optical fiber technique of the present invention permits point temperature measurements to be made at a distance from the detection and excitation apparatus. The use of such techniques for monitoring temperatures at various points in an industrial plant can easily involve optical fiber runs in excess of 100 meters. For such long runs, it may be preferable to use excitation radiation within the visible spectrum with a rare earth phosphor acting as the temperature indicating device. The particular excitation radiation that would be sent down the long optical fiber and the phosphor composition for such an application have been discussed earlier with respect to FIG. 3A. If conventional (non-rare earth) phosphors are used, many can be found which respond to visible radiation.

The technique can also be broadly applied to imaging thermography wherein an object scene is imaged onto a phosphor screen and the emissions detected through filters by a television camera to measure the relative intensity of two emission lines and thence the temperature of the image, the latter being proportional to the temperature of the object scene. In yet another approach to thermal imaging, the phosphor screen could be mounted within a vacuum tube, illuminated from one side by the thermal image, via a suitable infrared-transmitting window and substrate, and excited from the other side by an electron beam scanned in raster fashion. In this instance the thermal image could be reconstructed using a single pair of optical point detectors suitably filtered with the resultant line intensity ratio thence used to modulate the intensity of the electron beam of a cathode ray display tube which is also scanned in raster fashion in synchronism with the exciting electron beam.

Special Probe Designs

The fiber optic probe configurations discussed previously are limited in the upper temperature which they may be used to detect. This is because plastic materials that surround existing commercial optical fibers tend to degrade at temperatures above 150° C. to 200° C. When this happens, the result may be to reduce severely the light transmitting efficiency of the fiber. Similarly, at very low temperatures the indices of the fiber and cladding may come to the same value and the optical fiber ceases to act as a light pipe.

Figure 21:
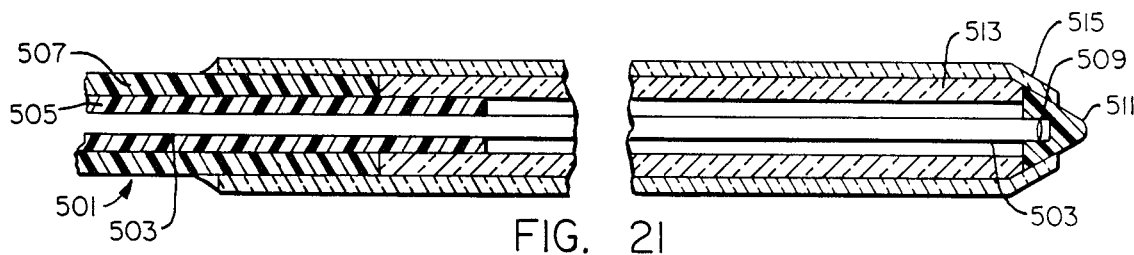
FIG. 21 shows a high temperature probe.

Referring to FIG. 21, a plastic-clad optical fiber 501 is shown in cross-section. It includes a silica core 503 surrounded by a silicone cladding 505 and an outer sheath 507. When the fiber is bent or is under pressure, the cladding typically flows allowing the sheath to contact the core with resultant loss of light upon sustained exposure to temperatures between 150° C. and 200° C. The sheath itself may melt or degrade at temperatures in the vicinity of 200° C. Thus, for localized higher temperature (or very low temperature) measurements, the sheath and cladding are removed from a length of the optical fiber at its free end. A phosphor temperature sensing material 509 of the type discussed previously is attached to an end of the fiber core 503. Encapsulating this phosphor and the end of the fiber is an opaque tip 511 that can withstand high temperatures. Single crystalline $NiO$, $Cr_2O_3$ or $MnO_2$ are examples of possibly useful tip materials. The tip could alternatively be of metal if the sensor is not to be used in an electromagnetically hostile environment.

In order to surround the exposed core 503 with something having a lower light refractive index and the ability to block light from entering or leaving the core along that length, a cylindrically shaped silica spacer 513 surrounds the core 503 in a manner so as to leave an air gap around the core which provides the necessary difference of index of refraction at the surface of the core material 503. The core 503 is held straight, preventing any extraneous light from entering or leaving the core 503. An outer cylindrically shaped silica holder 515 provides over-all structural rigidity. The materials at the end of the optical fiber are thus able to withstand temperatures of 300° C. and up. Conversely the probe can also be used at very low temperatures where the optical fiber might not conduct light for the reasons discussed earlier.

Because the fiber core 503 and surrounding cylindrical sleeves are all made of silica, the coefficient of expansion of the entire assembly is uniform. Silica is also inert so does not react with elements in the surroundings. Silica further does not conduct heat readily so the probe of FIG. 21 will not drain heat from or conduct heat to the environment being measured.

Because the tip 511 is of a different material than the silica elements it contacts, the tip cannot be threaded or glued in place since its likely different coefficient of expansion would break any such connection as the probe is heated and cooled. Therefore, the tip is conically shaped to be held in an opening at the end of the outer cylindrical sleeve 515 in a manner that it cannot be moved out through that opening. The tip 511 is securely held against an inside of the sleeve 515 by an end of the inner sleeve (spacer) 513. The end of the optical fiber core 503 containing a coating of phosphor 509 is frictionally held within a cylindrically shaped hole provided in the rear surface of the tip 511.

Another type of optical fiber uses a doped silica coating over a pure silica core in order to provide a self-cladded structure. However, a thin, organic buffer layer, typically an epoxy, is applied to an outer surface of the cladding to protect the fiber from oxidation and surface scratching which would lead to fiber breakage. This organic buffer is also unable to withstand temperatures of 200° C. and thus the probe structure of FIG. 21 can also be used to advantage with that type of existing optical fiber, modified to adapt to a fiber without the thick sheath 507 of the FIG. 21 plastic-clad optical fiber. The probe of FIG. 21 is very small in size, because it surrounds a single optical fiber and thus has all of the advantages discussed previously of small, unobtrusive temperature sensors. The thermally conducting tip 511 is made to be extremely small and is surrounded by thermally non-conducting materials.

Figure 22:
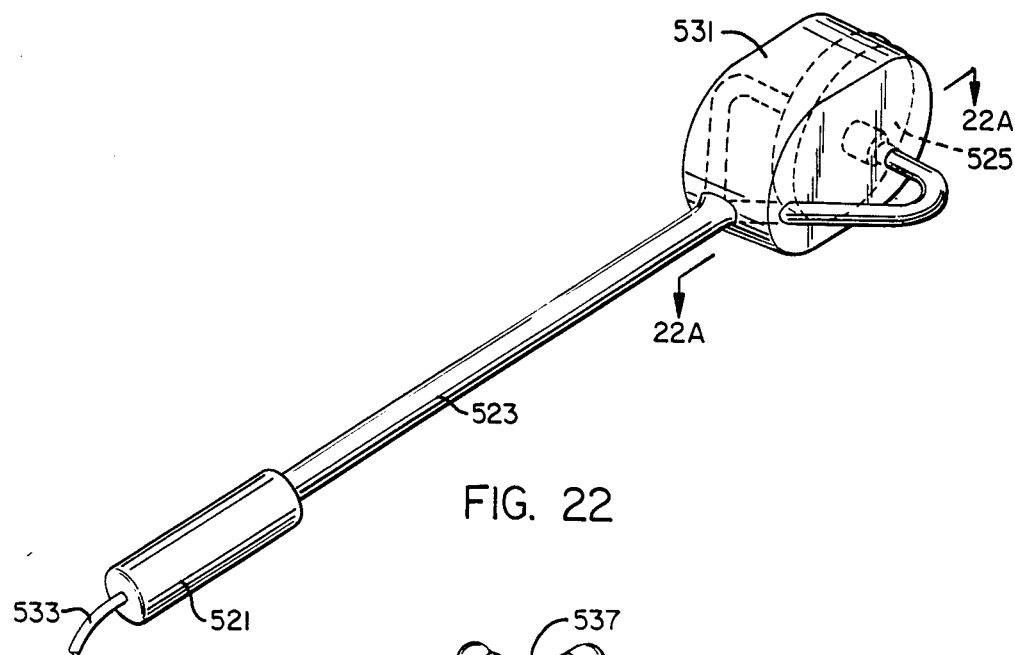
FIGS. 22 and 22A show a probe for detecting the temperature of a moving object or material.
Figure 22A:
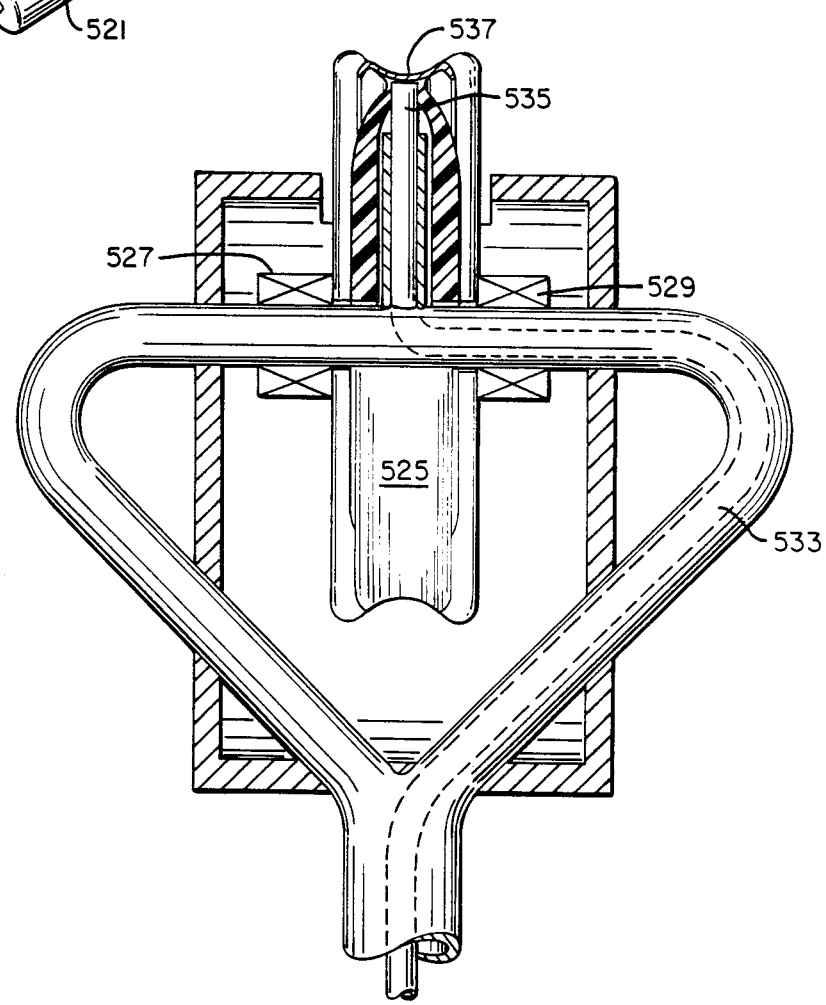

Another special application temperature sensor is illustrated in FIGS. 22 and 22A for contacting moving materials or machinery whose temperature is desired to be detected. This sensor is based upon the advantage of the present invention wherein transmission of temperature data is possible across a physical gap in the optical system, as discussed previously. There are applications wherein the temperature of an object moving with respect to the temperature measuring station is to be detected. The rotating probe of FIGS. 22 and 22A is especially adapted for contacting and measuring the temperature of moving wire, synthetic fiber, yarn, fabric, and similar items.

Referring to FIGS. 22 and 22A, a handle 521 is connected to an end of a probe shaft 523. Connected to another end of the probe shaft 523 is a rotating wheel 525. The roller 525 is rotatably held at the other end of the shaft 523 by bearings 527 and 529. A shroud 531 is attached to the shaft 523 and surrounds the wheel 525 in order to minimize convective cooling of the wheel.

An optical fiber 533 is carried within the shaft 523 along its entire length. An end portion 535 of the optical fiber 533 emerges from the shaft 523 within the wheel 525. The interior of the wheel 525 is hollow and shielded from exterior light. The optical fiber end 535 is held fixed to the shaft 523. The open interior of the wheel 525 is blocked from communicating with the outside around its circumference only by a thin metal strip 537 that extends completely around the outer circumference of the wheel. On its inside surface, the metal strip 537 is coated with a temperature sensitive phosphor, preferably of the type discussed previously. As the wheel 525 spins with respect to the shaft 523, the phosphor coated on the inside of the metal strip 537 passes continuously at close proximity to the extreme end of the optical fiber 535. The phosphor is illuminated by exciting radiation from the fiber. The fiber receives the fluorescent emission from the phosphor strip and returns it to an instrument for analysis and interpretation of the temperature as discussed previously.

Wire, fiber, yarn, and similar items whose temperature is to be measured may be drawn over the wheel within its outer circumferential groove in contact with the metal plate 537. As an example, the fiber or yarn may be being heated prior to processing. In this case, the rotating probe would provide a station for measuring and controlling fiber temperature while the fiber itself is moving rapidly. As another example, the rotating probe may itself be moved along an electrical transmission line for purposes of measuring heating and detecting resistive segments. However employed, the metal strip and phosphor layer are heated to the approximate temperature of the item in contact with the rotating probe. This temperature may then optically be determined from a remote detecting station along the optical fiber 533 according to one of the techniques described previously. This temperature sensing technique has an advantage of creating little or no friction with the article to be measured. The temperature measurement is therefore not altered by frictionally created heat.

The same type of instrument can advantageously be used for measuring the temperature of moving flat surfaces or rotating drums. For that application, there would be no concave groove in the outer circumference of the wheel 525 as shown in FIG. 22A, but rather the outside surface is made to be flat or slightly convex in order to make a good thermal contact between the circumferential thin metal piece and the surface of the article whose temperature is to be measured.

Other particular applications will become apparent from this description. Although the various aspects of the present invention have been described with respect to preferred embodiments thereof, it will be understood that the invention is entitled to protection within the full scope of the appended claims.

I claim:

1. For a temperature measuring system having a visible or near-visible electromagnetic radiation detector optically coupled to one end of at least one optical fiber for receiving radiation from said one fiber that is indicative of temperature, a radiation emitting temperature sensor, comprising:
    a carrier shaped for removable attachment to another end of said at least one optical fiber and adapted to be positioned in heat conductive relationship with an environment whose temperature is to be measured, and
    a quantity of phosphor material attached to said carrier in a position to emit radiation that is viewable by said detector at said at one end of said at least one one optical fiber when said carrier is attached to said another end, said phosphor material being characterized by emitting, when excited, detectable optical radiation that varies as a known function of the phosphor material temperature.

2. The temperature sensor according to claim 1 wherein said carrier includes an elongated hollow member open at one end to receive said at least one optical fiber and closed at another end, said phosphor material being carried by said hollow member at its said another end.

3. The temperature sensor according to claim 2 wherein said carrier is especially adapted for clinical thermometer use and is disposable.

4. The temperature sensor according to any of claims 1, 2, or 3 wherein said carrier is a heat conducting substrate and said phosphor material is coated onto a surface of said substrate.

5. The temperature sensor according to any of claims 1, 2, or 3 wherein said carrier is a medium that is optically transparent in at least a portion thereof to which said phosphor material is attached, and further wherein said phosphor material is carried within said medium.

6. The temperature sensor according to claim 1 wherein said carrier is especially adapted for clinical thermometer use and is disposable.

7. The temperature sensor according to any of claims 1, 2, 3 or 6 wherein the emitted radiation of said phosphor is additionally characterized by having relative intensities within two optically isolatable bandwidths that vary as a known function of the phosphor temperature.

8. A temperature probe sleeve, comprising:
    an elongated hollow member being open at one end and enclosed at another end, said open end of the member being configured to receive an optical fiber therethrough, and a layer of phosphor material held in immediate physical contact with said another end of said hollow member, the phosphor material being characterized by emitting, when excited from a remote source, detectable optical radiation that varies as a known function of the phosphor temperature, whereby said sleeve is positionable on an end of an optical fiber to transmit the exciting radiation to said phosphor and transmit phosphor emissions along said fiber for the purposes of determining temperatures of the surroundings of said enclosed hollow member end.

9. The probe sleeve according to claim 8 which additionally comprises a layer of opaque material at said another end on its outside surface, whereby extraneous light is prevented from entering the optical fiber when the cover is used for temperature measurement.

10. The probe sleeve according to claim 8 wherein said hollow member is especially adapted for clinical thermometer use and is disposable.

11. The combination according to any of claims 1, 2, 8, 9 or 10 wherein said phosphor is additionally characterized by emitting, when excited, electromagnetic radiation within optically isolatable bandwidths at at least two distinct wavelength ranges and with relative intensities therein that vary as a known function of the phosphor temperature.

12. The combination according to any of claims 1, 2, 3, 8, 9 or 10 wherein said phosphor is additionally characterized by emitting, when excited, at least two non-overlapping optical sharp spectral lines of radiation that each rise from substantially zero emission to a peak in less than 100 angstroms bandwidth.

13. The combination according to any of claims 1, 2, 3, 8, 9 or 10 wherein said phosphor comprises a composition $(RE)_2O_2S:X$ wherein RE is an element selected from the group consisting of lanthanum, gadolinium and yttrium, and wherein X is a doping element with a concentration of from 0.01 to 10.0 atom percent and is selected from the group consisting of europium, terbium, praseodymium, samarium, dysprosium, holmium, erbium and thulium.

14. The combination according to any of claims 1, 2, 3, 8, 9 or 10 wherein said phosphor comprises a composition $(RE)_2O_2S:X$ wherein RE is an element selected from the group consisting of lanthanum, gadolinium and yttrium, and wherein X is one or more activators with a concentration of from 0.01 to 10.0 atom percent and is selected from the group consisting of europium, terbium, praseodymium, samarium, dysprosium, holmium, erbium, thulium, neodymium and ytterbium.

15. A method of determining the temperature of a location within a biological body, comprising the steps of:
providing a length of optical fiber,
positioning a layer of phosphor material at one end of said optical fiber to form a temperature probe thereon, the phosphor material being characterized by emitting, when excited, detectable optical radiation that varies as a known function of the phosphor temperature,
placing said temperature probe within a biological body,
exciting said phosphor to cause emission of said optical radiation,
directing said phosphor emission through said optical fiber to a detecting station at another end of the optical fiber, and
detecting at the detecting station the intensity of said optical radiation, whereby said intensity is an indication of the temperature of the phosphor material layer and related thereto by said known temperature emission function.

16. A method according to claim 15 comprising an additional step of irradiating a portion of the biological body in which the probe is placed with heat generating radiation.

17. A temperature probe system, comprising:
an optical fiber bundle having at least one distinct group of one or more fibers for optically conducting light between one end thereof and the other;
a temperature sensitive element located at said one end of said optical fiber bundle, said temperature sensitive element having temperature sensitive luminescent properties and being adapted to be positioned in the environment whose temperature is to be measured;
means for exciting said temperature sensitive element to luminescence; and
light responsive detection means located at the other fiber bundle end for detecting light directed from said temperature sensitive element and passed through said optical fiber bundle.

18. A temperature probe system, comprising:
an optical fiber bundle having a first group and a second group of one or more optical fibers which are physically separated at one end of said bundle;
a temperature sensitive element having temperature sensitive luminescent properties, said temperature sensitive element being located at the other end of said bundle in optical communication with both first and second groups thereof and being adapted to be positioned in the environment whose temperature is to be measured;
a light source located proximate said first group of optical fibers at said one end of said bundle, said light from said source optically passing through said first bundle to excite said temperature sensitive element; and
light responsive detection means located proximate said second group of optical fibers at said one end of said bundle, said light emitted from said temperature sensitive element passing through said second bundle to said light responsive detection means.

19. A temperature probe system, comprising:
an optical fiber bundle having at least one optical fiber;
a temperature sensitive element having temperature sensitive luminescent properties when excited by a light source and having the property of emitting light during luminescence at a different frequency than that it absorbs, said temperature sensitive element being located at one end of said bundle and being adapted to be positioned in the environment whose temperature is to be measured;
an exciting light source located proximate the other end of said bundle, said light source having a given frequency spectrum that includes a frequency absorbed by said temperature sensing element;
means proximate said other end for separating the light passed from said source toward said temperature sensitive element from that being emitted from said temperature sensitive element; and
light responsive detection means located proximate said other end of said bundle, said light responsive detection means including means for detecting a characteristic of the light emitted from said light sensitive element as a function of the change in temperature of said temperature responsive element.

20. The temperature probe according to claim 19 wherein said separating means includes a beam splitter and an excitation frequency filter associated with said source and a luminescent response filter associated with said light responsive detection means.

21. A temperature probe system, comprising:
an optical fiber bundle having at least one optical fiber;
a temperature sensitive element having temperature sensitive luminescent properties, said temperature sensitive element being located at one end of said bundle and being adapted to be positioned in the environment whose temperature is to be measured;
a radioactive source located proximate said temperature sensitive element for exciting said temperature sensitive element; and
light responsive detection means located proximate the other end of said bundle for detecting the emission response of said temperature sensitive element as a function of its temperature.

22. The temperature probe according to any of claims 17, 18, 19 or 21 wherein said temperature sensitive element includes a phosphorescent material.

23. The temperature probe according to any of claims 17, 18, 19 or 21 wherein said temperature sensitive element includes a phosphor material encapsulated in an optically opaque element.

24. The temperature probe according to any of claims 17, 18, 19 or 21 wherein said temperature sensitive element includes a phosphor material having a luminescent response which is temperature dependent.

25. A temperature probe system, comprising:
an optical fiber bundle having at least one optical fiber;
a temperature sensitive element having radioactive and luminescent temperature sensitve properties, said temperature sensitive element being located at one end of said bundle and being adapted to be positioned in the environment whose temperature is to be measured; and
light responsive detection means located proximate the other end of said bundle for detecting the emission response of said temperature sensitive element as a function of its temperature.

26. The temperature probe according to claim 24 wherein said temperature sensitive element is a radioactivated phosphor material.

27. The combination of any of claims 17, 18, 19, 21 and 25 wherein the luminescence of the temperature sensitive element is characterized by relative intensities within two optically isolatable bandwidths that vary as a known function of the element's temperature, and further wherein said detection means includes means for detecting the luminescent intensity of the temperature sensitive element within each of said two bandwidths, and means for comparing the levels of intensity within said bandwidths, wherein said comparison provides an indication of said element's temperature.

* * * * *

UNITED STATES PATENT AND TRADEMARK OFFICE
CERTIFICATE OF CORRECTION

PATENT NO. : 4,560,286

DATED : Dec. 24, 1985

INVENTOR(S) : Wickersheim

It is certified that error appears in the above-identified patent and that said Letters Patent is hereby corrected as shown below:

Col. 28, line 30: "at said at one" should read --at said one--;
        line 31: "one one optical" should read --one optical--;

Col. 29, line 21: after "2," insert --3,--;

Col. 32, line 9: "sensitve" should read --sensitive--; and
        line 18: "claim 24" should read --claim 25--.

Signed and Sealed this

Twenty-fifth Day of March 1986

[SEAL]

Attest:

DONALD J. QUIGG

Attesting Officer     Commissioner of Patents and Trademarks